(12) United States Patent
Mikkelsen et al.

(10) Patent No.: US 7,949,261 B2
(45) Date of Patent: May 24, 2011

(54) PARTIAL DPSK (PDPSK) TRANSMISSION SYSTEMS

(75) Inventors: Benny Mikkelsen, Newton, MA (US); Pavel Mamyshev, Morganville, NJ (US); Christian Rasmussen, Shrewsbury, MA (US); Fenghai Liu, Nashua, NH (US)

(73) Assignee: Mintera Corporation, Acton, MA (US)

( * ) Notice: Subject to any disclaimer, the term of this patent is extended or adjusted under 35 U.S.C. 154(b) by 632 days.

(21) Appl. No.: 11/740,212

(22) Filed: Apr. 25, 2007

(65) Prior Publication Data
US 2007/0196110 A1    Aug. 23, 2007

Related U.S. Application Data

(60) Provisional application No. 60/795,121, filed on Apr. 26, 2006.

(51) Int. Cl.
*H04B 10/06* (2006.01)
(52) U.S. Cl. ........ 398/208; 398/202; 398/209; 398/212; 398/213; 398/140; 398/141; 398/158
(58) Field of Classification Search .................. 398/140, 398/158–161, 183, 188, 208, 209, 212, 213
See application file for complete search history.

(56) References Cited

U.S. PATENT DOCUMENTS

| | | | |
|---|---|---|---|
| 6,947,206 B2 | 9/2005 | Tsadka et al. | |
| 2003/0175036 A1 | 9/2003 | Mamyshev et al. | |
| 2003/0175037 A1 | 9/2003 | Kimmitt et al. | |
| 2003/0218790 A1 | 11/2003 | Mikkelsen et al. | |
| 2005/0069330 A1* | 3/2005 | Kao et al. ........................ 398/188 |
| 2005/0088659 A1* | 4/2005 | Schlenk et al. ................ 356/477 |
| 2006/0067703 A1* | 3/2006 | Haunstein et al. ............. 398/161 |
| 2006/0072924 A1 | 4/2006 | Lee et al. | |
| 2006/0171720 A1* | 8/2006 | Agarwal et al. ................ 398/186 |
| 2006/0193639 A1* | 8/2006 | Liu et al. ........................ 398/161 |
| 2007/0003184 A1* | 1/2007 | Takahara et al. ................. 385/14 |
| 2007/0196110 A1 | 8/2007 | Mikkelsen et al. | |

FOREIGN PATENT DOCUMENTS

EP    0 967 743 A2    12/1999

(Continued)

OTHER PUBLICATIONS

Winzer et al: "Degradations in Balanced DPSK Receivers", IEEE Photonics Technology Letters, vol. 15, No. 9, Sep. 2003, pp. 1282-1284.*

(Continued)

*Primary Examiner* — Li Liu
(74) *Attorney, Agent, or Firm* — Nelson Mullins Riley & Scarborough, LLP; Anthony A. Laurentano, Esq.

(57) ABSTRACT

An optical receiver includes a demodulator having a delay interferometer comprising an optical input that receives a phase modulated optical signal from a bandwidth limited transmission system. The delay interferometer has a free spectral range that is larger than a symbol rate of the phase modulated optical signal by an amount that improves receiver performance. The receiver also includes a differential detector having a first and a second photodetector. The first photodetector is optically coupled to the constructive optical output of the delay interferometer. The second photodetector is optically coupled to the destructive optical output of the delay interferometer. The differential detector combines a first electrical detection signal generated by the first photodetector and a second electrical detection signal generated by the second photodetector to generate an electrical reception signal.

29 Claims, 18 Drawing Sheets

FOREIGN PATENT DOCUMENTS

| | | |
|---|---|---|
| EP | 1 519 499 A1 | 3/2005 |
| GB | 2 257 319 A | 1/1993 |
| JP | 2004-254242 | 9/2004 |
| JP | 2005-110256 | 4/2005 |
| JP | 2006-246471 | 9/2006 |
| WO | 2007/025037 A2 | 3/2007 |

OTHER PUBLICATIONS

Agarwal et al: "Experimental Study of Photocurrent Imbalance in a 42.7-Gb/s DPSK Receiver under Strong Optical Filtering", OFC 2005, Mar. 6-11, 2005, paper OFN4, pp. 1-3.*

Gnauck, et al., "Optical Phase-Shift-Keyed Transmission", IEEE Journal of Lightwave Technology, vol. 23, pp. 115-130, 2005.

Lyubomirsky, et al., "Impact of Optical Filtering on Duobinary Transmission", IEEE Photon, Technol. Lett. 16, 1969 (2004).

Malouin, "Differential Phase-Shift Keying Receiver Design Applied to Strong Optical Filtering", IEEE Journal of Lightwave Technology, vol. 25, pp. 3536-3542, 2007.

Malouin et al., "DPSK Receiver Design—Optical Filtering Considerations", OFC 2007 OTHK 1.

Mikkelsen, et al., "Partial DPSK with Excellent Filter Tolerance and OSNR Sensitivity", Electronics Letters, vol. 42, pp. 1363-1365, 2006.

Winzer, et al., "Degradations in Balanced DSPK Receivers," IEEE Photonics Technology Letters, vol. 15, No. 9, Sep. 2003.

Yoshikane, Noboru, et al., Benefit Of Half-Bit Delay Demodulation For Severely Bandlimited RZ-DPSK Signal, KDDIR & D Laboratories, Japan.

Gnauck, A.H., et al., 2.5 Tb/s (64×42.7 Gb/s) Transmission Over 40×100 km NZKSF Using RZ-DPSK Format And All-Raman-Amplified Spans, 2002, pp. FC2-1-FC2-3, Optical Society of America.

Humblet, et al., On The Bit Error Rate Of Lightwave Systems With Optical Amplifiers, Journal Of Lightwave Technology, Nov. 1991, pp. 1576-1582, vol. 9, No. 11.

Hsieh, et al., Athermal Demodulator For 42.7-Gb/s DPSK Signals.

Lyubomirsky, et al, DPSK Demodulator Based On Optical Discriminator Filter, IEEE Photonics Technology Letters, Feb. 2005, pp. 492-494, vol. 17, No. 2.

Agarwal, A., et al., Experimental Study Of Photocurrent Imbalance In A 42.7/Gb/s DPSK Receiver Under Strong Optical Filtering, 2005, pp. 1-3, Optical Society of America.

Bosco, G., et al., The Impact Of Receiver Imperfections On The Performance Of Optical Direct-Detection DPSK, Journal Of Lightwave Technlogy, Feb. 2005, pp. 842-848, vol. 23, No. 2.

Japanese Office Action for Application No. 2009-507763, dated Mar. 8, 2011.

* cited by examiner

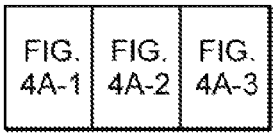
FIG. 4A
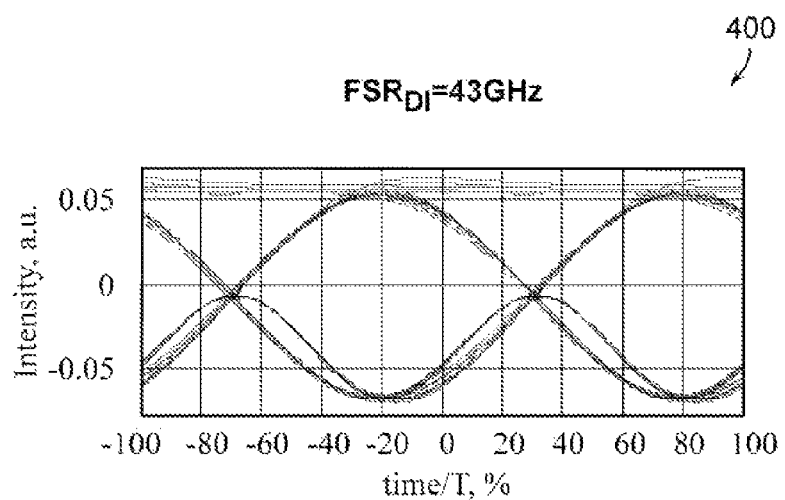
Filter
BW=80 GHz
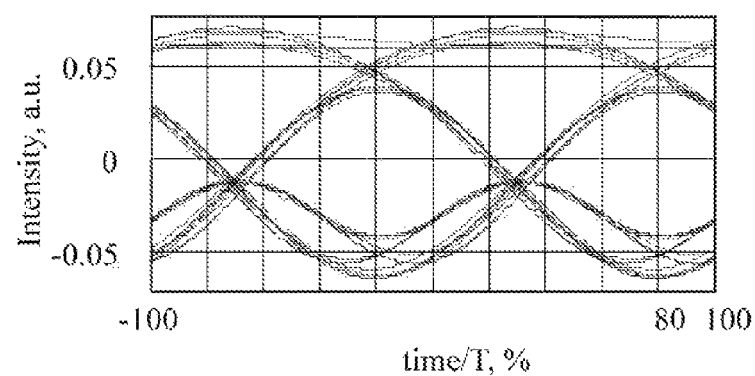
Filter
BW=40 GHz
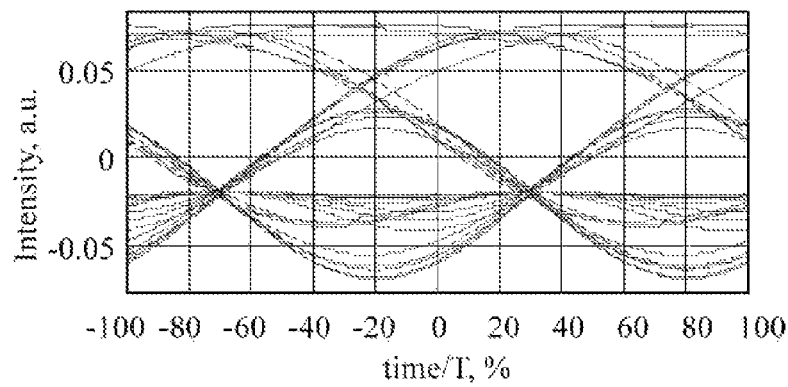
Filter
BW=28 GHz
FIG. 4A-1

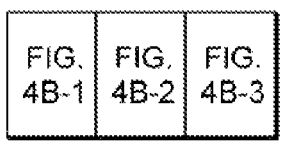
FIG. 4B
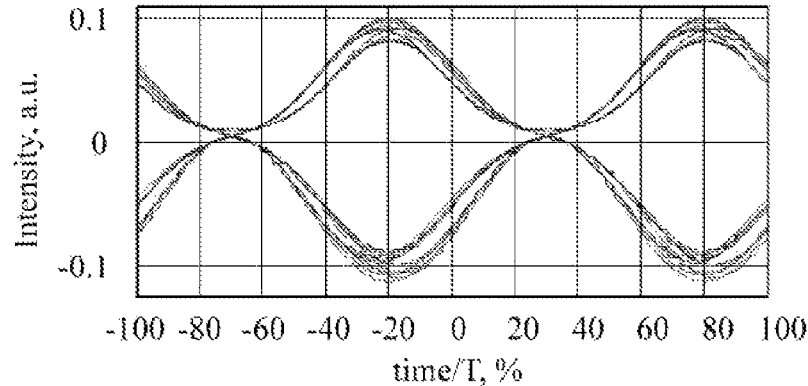
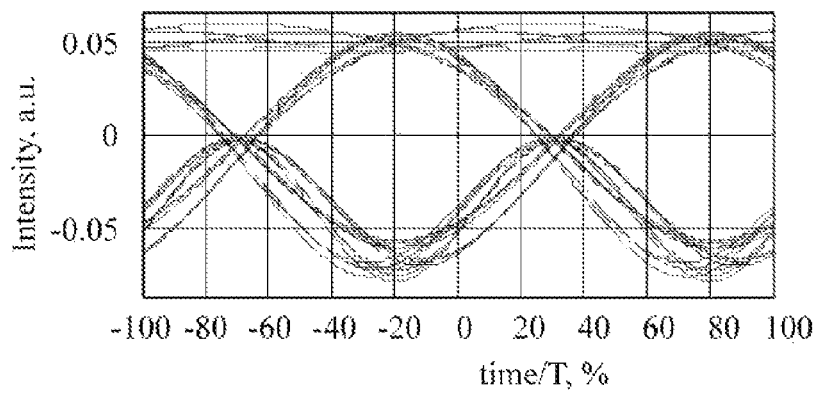
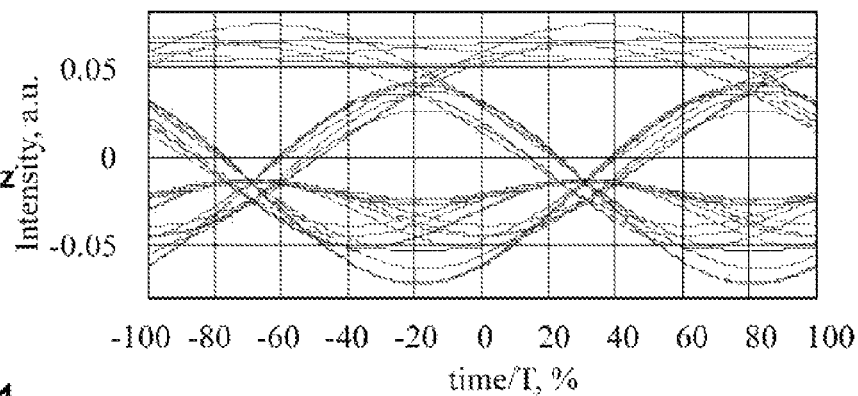
FIG. 4B-1

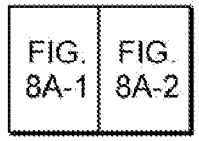
FIG. 8A
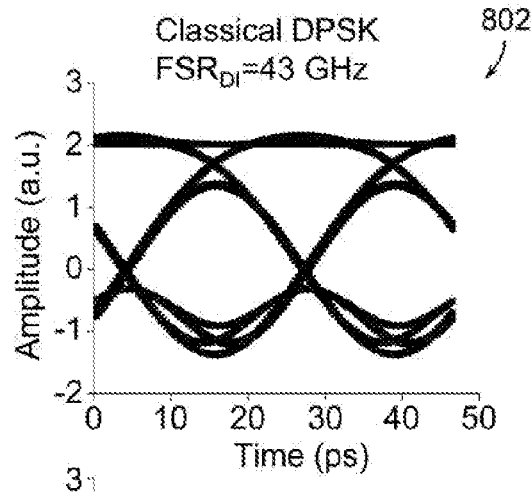
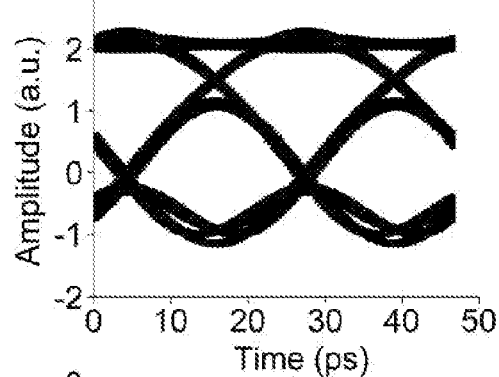
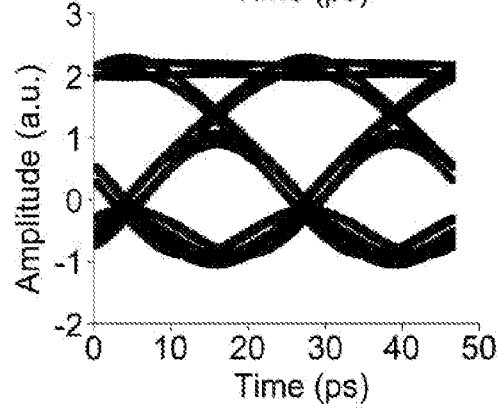
FIG. 8A-1

PARTIAL DPSK (PDPSK) TRANSMISSION SYSTEMS

The section heading used herein are for organizational purposes only and should not to be construed as limiting the subject matter described in the present application.

RELATED APPLICATION SECTION

This application claims priority to U.S. Provisional Patent Application Ser. No. 60/795,121, filed Apr. 26, 2006, entitled "Quasi Differentially Demodulated DPSK and Quasi Differentially Demodulated DQPSK Modulation Formats (QD-PSK/QD-QPSK)", the entire application of which is incorporated herein by reference.

BACKGROUND SECTION

DWDM optical fiber transmission systems operating at channel rates of 40 Gb/s and higher are highly desirable because they potentially have greater fiber capacity and also have lower cost per transmitted bit compared to lower channel rate systems. Currently, many DWDM optical fiber transmission systems operate at a channel rate of 10 Gb/s. It is desirable for these 40 Gb/s transmission systems to be compatible with the currently existing 10 Gb/s transport architectures.

The modulation format of 40 Gb/s DWDM transmission systems must be chosen to have high Optical Signal-to-Noise Ratio (OSNR) sensitivity. High OSNR sensitivity means that a low OSNR is sufficient to maintain a desired bit error rate (BER) of the transmission or, equivalently, that the system is able to operate at a desired BER even in the presence of a high level of optical noise. In addition, modulation formats of 40 Gb/s DWDM transmission systems must be chosen to be tolerant to optical filtering because existing systems sometimes include optical multiplexers and demultiplexers for 50 GHz channels spacing that limit the bandwidth. Also, existing systems sometimes include many cascaded optical add-drop multiplexers.

The Phase-Shaped-Binary-Transmission (PSBT) format has been considered for 40 Gb/s DWDM transmission systems because of its narrow spectrum. However, PSBT has relatively poor OSNR receiver sensitivity, meaning that it requires a relatively high OSNR to obtain a low BER. Also, the OSNR receiver sensitivity is dependent on the level of applied optical filtering.

Also, Differential Phased Shift Keying (DPSK), which is sometimes referred to as Differential Binary Phased Shift Keying (DBPSK) has been considered for 40 Gb/s DWDM transmission systems. DPSK transmission systems have excellent OSNR sensitivity. DPSK transmission systems using balanced direct detection receivers, which are sometimes referred to as differential receivers, have been shown to have an approximately 3 dB improvement of OSNR sensitivity compared to on-off keying systems, such as NRZ and PSBT systems. However, DPSK transmission systems do not have good filter tolerance.

In addition, Differential Quadrature Phased Shift Keying (DQPSK) has been considered for 40 Gb/s DWDM transmission systems. DQPSK uses a symbol rate that is one half of the data rate. For example, a 43 Gb/s data rate in a DQPSK system corresponds to 21.5 Giga symbols per second. Consequently, DQPSK transmission systems have a narrower spectral bandwidth, greater chromatic dispersion tolerance and greater tolerance with respect to polarization mode dispersion (PMD) compared to traditional formats and compared to DPSK. However, DQPSK transmission systems have approximately 1.5-2 dB worse receiver sensitivity than DPSK transmission systems. Furthermore, both the transmitter and the receiver are significantly more complex than DPSK transmitter/receiver.

DPSK and DQPSK receivers use one or more optical demodulators that convert the phase modulation of the transmitted optical signal into amplitude modulated signals that can be detected with direct detection receivers. Typically, optical demodulators are implemented as delay interferometers that split the optical signal into two parts, delay one part relative to the other by a differential delay $\Delta t$, and finally recombine the two parts to achieve constructive or destructive interference depending on the phase which is modulated onto the optical signal at the transmitter.

It is conventional wisdom that DPSK and DQPSK signal are optimally received by delay interferometers that have a differential delay $\Delta t = nT$, where $n=1, 2, 3 \ldots$, $T=1/B$ is the symbol time slot, and B is the symbol rate. See, for example, the theoretical investigation in "On the bit error rate of lightwave systems with optical amplifiers" by P. A. Humblet et al, J. Lightwave Technol., pp. 1576-1582, 1991. See also the experimental investigation in "2.5 Tb/s (64×42.7 Gb/s) transmission over 40×100 km NXDSF using RZ-DPSK format and all-Raman amplified spans", by A. H. Gnauck et al., in proceeding of OFC, post deadline paper FC2, February 2002.

It is also conventional wisdom that using delay interferometers with a delay that is shorter or longer than the symbol time slot will result in some receiver performance penalties when receiving DPSK and DQPSK signals. See, for example, the investigation of single-channel DPSK systems in "Degradations in Balanced DPSK Receivers", by Peter J. Winzer and Hoon Kim, IEEE Photonics Technology Letters, Vol. 15, 1282, No. 9, September 2003. According to the Winzer and Kim reference, the performance penalty increases in a nearly parabolic relationship when the differential delay $\Delta t$ of the delay interferometer deviates from the symbol time slot or, equivalently, the free spectral range (FSR)=$1/\Delta t$ of the delay interferometer deviates from the signal symbol rate. See also the investigation of single-channel DPSK systems in "Athermal Demodulator for 42.7-Gb/s DPSK Signals," by Y. C. Hsieh et al, in proceeding of ECOC, paper Th1.5.6, September 2005. In this reference the authors teach that a degradation in OSNR sensitivity is typically incurred by a FSR different from $1/\Delta t$. However, Y. C. Hsieh et al. propose to use a delay interferometer with a FSR of 50 GHz despite the performance penalty to be able to operate a single-channel at any ITU frequency without the need for active control of the delay interferometer. Neither Y. C. Hsieh et al nor Peter J. Winze et al considered any influence of narrow optical bandpass filtering or the use of optical filters that are typically needed for multi-channel applications, i.e., Dense Wavelength Division Multiplexing (DWDM) applications. Hence, the common believe today is that DPSK and DQPSK signals are optimally received with a delay interferometer with a differential delay that equals the symbol time slot.

Both DPSK and DQPSK modulation formats are used in a non-return-to-zero (NRZ) variant where the light intensity can be constant between two neighboring symbols and a return-to-zero (RZ) variant where the light intensity always drop or return to zero between each symbol. The intensity returns to zero even if the data signal includes numerous consecutive zeros or ones. Transmitters using RZ-type modulation formats can achieve better OSNR receiver sensitivity and tolerance to fiber nonlinearities than transmitters using NRZ-type modulation formats. Return-to-zero modulation pulses are typically created using pulse carving techniques.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
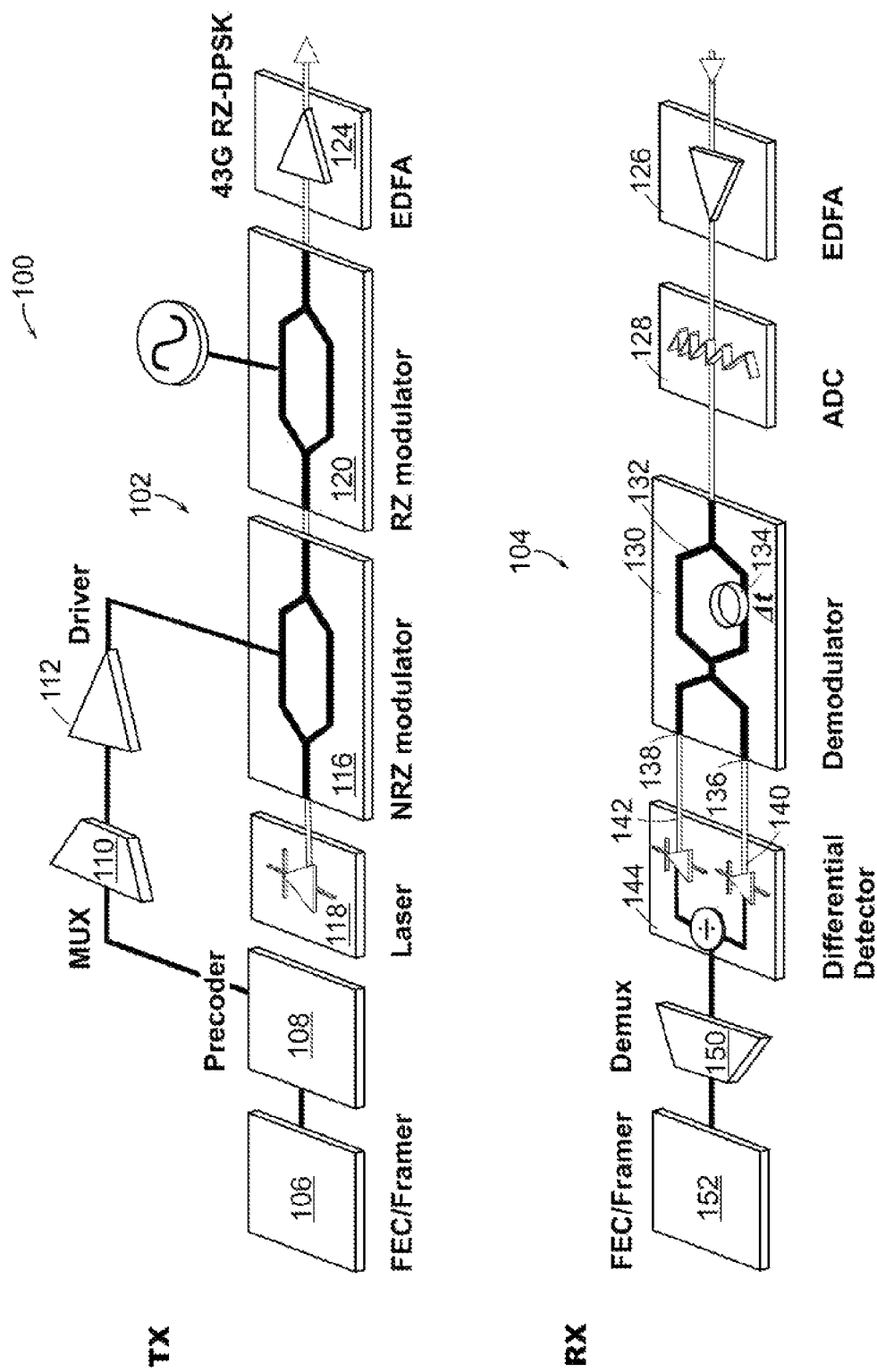
FIG. 1 shows a schematic diagram of one embodiment of a PDPSK transmission system according to the present invention that includes a transmitter and a PDPSK receiver that receives PDPSK signals according to the present invention.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

For example, it should be understood that there are numerous variations of the PDPSK receivers according to the present invention. In particular, it should be understood that the methods and apparatus of the present invention are not limited to any particular type of demodulator. In addition, it should be understood that the methods and apparatus of the present invention can be used with any type of multilevel phase modulation including RZ and NRZ types of modulation.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present invention is in part the recognition that the common believe today that DPSK and DQPSK signals are optimally received with a delay interferometer with a differential delay that is equal to the symbol time slot does not apply to systems where the DPSK or DQPSK signals have been narrowly filtered. On the contrary, it has been discovered that for such narrowly filtered systems, DPSK and DQPSK signals are optimally received with a delay interferometer having a differential delay that is significantly less than the symbol time slot.

The present invention features methods and apparatus for transmitting and receiving modified DPSK (or DQPSK) modulation formats that have improved OSNR receiver sensitivity performance. The modified DPSK (or DQPSK) modulation format of the present invention is referred to herein as Partial Differential Phased Shift Keying (PDPSK). The term "PDPSK" is used herein to refer to both the conventional DPSK and also to the DQPSK modulation formats. The term PDPSK was referred to in U.S. Provisional Patent Application Ser. No. 60/795,121 as Quasi Differentially Demodulated DPSK and Quasi Differentially Demodulated DQPSK Modulation Formats. These terms are equivalent.

In particular, the PDPSK demodulation technique of the present invention improves performance of spectrally efficient transmission systems that include systems with reduced transmitter, optical link and/or receiver bandwidths, such as transmitters, optical links and/or receivers with any kind of narrow optical filtering as described herein. In addition, the PDPSK demodulation technique of the present invention improves performance in systems with significant chromatic dispersion. In one embodiment, the modified system of the present invention is achieved by performing DPSK/DQPSK-type delay interferometer demodulation at the receiver using a differential delay that is less than one symbol time slot. In one specific embodiment, the modified system of the present invention is achieved by performing DPSK/DQPSK-type delay interferometer demodulation in the receiver using a differential delay that is less than 0.85 of one symbol time slot. This is in contrast to known DPSK/DQPSK demodulation techniques which use a differential delay that is greater than or equal to one symbol time slot.

FIG. 1 shows a schematic diagram of one embodiment of a PDPSK transmission system 100 according to the present invention that includes a transmitter 102 and a PDPSK receiver 104 that receives PDPSK signals according to the present invention. The PDPSK transmitter 102 includes a FEC/Framer 106 having an output that is electrically connected to an input of a precoder 108. The output of the precoder 108 is electrically connected to an input of a multiplexer 110. An output of the multiplexer 110 is electrically connected to an electronic driver circuit 112.

An output of the driver circuit 112 is electrically connected to a modulation input of a NRZ Mach-Zehnder Interferometer (MZI) modulator 116. It should be understood that the invention is not limited to MZI based modulator shown in FIG. 1.

An output of a laser 118 is optically connected to an optical input of the NRZ modulator 116. The output of the NRZ modulator 116 is optically coupled to an optical input of a pulse carving RZ modulator 120. Alternatively, any type of pulse carving device that converts NRZ data to RZ can be used. An output of a sinusoidal source 122 is electrically connected to a modulation input of pulse carving RZ modulator 120. Embodiments that generate only NRZ-type modulated signals do not include the RZ modulator 120 and sinusoidal source 122.

Some transmitters use an optical fiber amplifier 124, such as an erbium doped optical fiber amplifier (EDFA) to amplify the signals generated by the RZ modulator 120. Such EDFAs are well known in the art. In such transmitters, an optical output of the RZ modulator 120 is optically coupled to an input of a fiber amplifier 124.

In operation, the FEC/Framer 106 in the PDPSK transmitter 102 provides a frame and the forward error correction to the data being transmitted. The precoder 108 performs differential phased shift keying encoding of the data. In some embodiments, the precoder 108 is a separate component and in other embodiments the precoder 108 is an integrated part of other components. In some embodiments, the differential encoding function is performed at the receiver in which case it is termed postcoding.

The multiplexer 110 multiplexes the data. The driver circuit 112 amplifies the framed multiplexed data signals with the forward error correction to levels that are suitable for modulating with the NRZ modulator 116. The NRZ modulator 116 modulates the encoded data with a NRZ format on the optical signal generated by the laser 118. The RZ modulator 120 that is driven by the sinusoidal source 122 performs the pulse carving necessary to transform the modulated NRZ signal into a modulated RZ signal. In embodiments that generate only NRZ modulation formats, no pulse carving is performed. In some transmission systems, the fiber amplifier 124 is used to amplify the modulated RZ signal to the desired signal level for transmission across the channel or transmission line (not shown). The resulting RZ modulated signal is a DPSK/DQPSK modulated data signal.

The PDPSK receiver 104 includes an input that receives the transmitted DPSK/DQPSK modulated data signal across the channel. Some receives include an optical fiber amplifier 126, such as an EDFA, at the input of the receiver 104. The input of the receiver 104 is optically coupled to an optical input of the fiber amplifier 126. Some receives also include an adaptive dispersion compensator (ADC) 128. In such receivers, an optical output of the fiber amplifier 126 is optically coupled to an optical input of the ADC 128.

An optical output of the ADC 128 is optically coupled to an input of an optical demodulator 130. In many receivers according to the present invention, the demodulator 130 is a delay interferometer 132 that is realized with at least one Michelson Interferometer or at least one MZI as shown in FIG. 1. The delay interferometer 132 can provide a fixed optical delay or can include a variable optical delay 134. The fixed optical delay or the variable differential delay provides a delay that is less than one bit-period as described herein. The delay interferometer 134 includes a constructive output 136 and a destructive output 138.

In some embodiments, the variable optical delay 134 is a continuously variable optical delay. In other embodiments, the variable optical delay 134 is switchable between a predetermined number of discrete optical delays. These variable optical delays can be constructed in numerous ways. For example, a continuously variable optical delay can be constructed with a translatable mirror, or with a translatable collimator. A continuously variable optical delay can also be constructed with a transparent material having variable optical thickness in one of the arms of the delay interferometer 132. A switchable variable optical delay can be made by physically introducing transparent materials with different optical thickness. A switchable variable optical delay can also be made by positioning a rotating mirror inside the delay interferometer 132 to switch between different paths having different time delays. In addition, a switchable variable optical delay can be made using various types of MEMS technology.

A first 140 and second input 142 of a balanced or differential receiver 144 is optically coupled to a respective one of the constructive 136 and the destructive output 138 of the delay interferometer 134. In many PDPSK receivers, the differential receiver 144 is realized with a first 146 and second photo detector 148. An output of the differential receiver 144 is electrically coupled to an input of a demultiplexer 150. In some PDPSK receivers, an electronic amplification stage (not shown) is used between the differential receiver 144 and the demultiplexer 150. An output of the demultiplexer 150 is electrically connected to a FEC/Framer 152. The demultiplexer 150 typically performs the data and clock recovery function.

In operation, optically modulated DPSK/DQPSK signals are received at an input of the PDPSK receiver 104 and are amplified by the fiber amplifier 126. In some PDPSK receiver systems, the ADC 128 performs dispersion compensation. The delay interferometer 132 in the optical demodulator 130 converts the PDPSK phase-modulated signal into an amplitude-modulated optical signal at the constructive output 136. The delay interferometer 132 also generates an inverted amplitude-modulated optical signal at the destructive output 138. The polarity of the data on the constructive output 136 and the destructive output 138 can be inverted by changing the relative phase between the two interferometer arms of the delay interferometer 138 by approximately $\pi$.

The differential delay between the two delay interferometer outputs and the two inputs of the differential detectors is typically less than 30% of a symbol time slot. In some embodiments the differential delay is less than 10%. The relative optical power propagating from the constructive port 136 and the destructive port 138 of the delay interferometer 132 is a function of the FSR of the delay interferometer 132 and of the degree of the optical filtering of the signal in the transmission line. For example, when the FSR of the delay interferometer 132 increases, the optical power in the constructive port 136 increases relative to the optical power in the destructive port 138.

The output signals from the constructive output 136 and the destructive output 138 of the delay interferometer 132 in the demodulator 130 are detected with the differential receiver 144 that includes the first 146 and second photo detector 148. The first photodetector 146 generates an electrical detection signal that is proportional to the optical signal propagating from the constructive output 136. The second photodetector 148 generates an electrical detection signal that is proportional to the optical signal propagating from the destructive output 138.

The differential receiver 144 electrically subtracts the electrical detection signal generated by the first and second photodetectors 146, 148 from each other to create a differential detection signal. A DPSK and DQPSK receiver according to the present invention can also receive phase modulation signals where the encoded phase difference between constellation points differ from $\pi$ and $\pi/2$, respectively. It should be understood that the methods and apparatus of the present invention can be used in combination with any optical or electrical equalizer.

One skilled in the art understands that the best OSNR receiver sensitivity performance for known DPSK/DQPSK transmission systems is obtained when the time delay $\Delta t$ between the two arms of the delay interferometer is exactly equal to an integer number of the symbol time slots of the optical DPSK/DQPSK data signal. Furthermore, one skilled in the art understands that the penalty in OSNR and receiver sensitivity in these systems increases rapidly (quadratically in most systems) when $\Delta t$ deviates from its optimal value. See, for example, Peter J. Winzer and Hoon Kim, IEEE Photonics Technology Letters, vol. 15, no. 9, pages 1282-1284, September 2003. Thus, one skilled in the art understands that the optimum free spectral range (FSR=$1/\Delta t$) of the delay interferometer 132 is equal to $1/nT$, and in the special case of n=1, the optimum free spectral range is equal to the symbol rate of the signal. The term "free spectral range" of an interferometer is well known in the art as the distance (in frequency space) between adjacent transmission peaks.

The present invention is in part the recognition that decreasing the differential delay generated by the delay interferometer 132 to less than one bit-period significantly increases the transmission system's tolerance to narrow optical filtering and to chromatic dispersion in high data rate transmission systems. It has been discovered that the well known equation $\Delta t=n\,T$, where n=1, 2, 3 . . . , T=1/B is the symbol time slot, and B is the symbol rate, represents the optimum delay only under certain conditions. In particular, it has been discovered that the equation $\Delta t=nT$, where n=1, 2, 3 . . . , represents the optimum delay only under conditions where there is no significant optical filtering (i.e. weak filtering) and where the data signals being processed by the transmitter 102 and the receiver 104 have near ideal rise/fall times. The present invention can be understood by viewing the total system bandwidth as a combination of individual component bandwidths as described in connection with FIG. 2.

Figure 2:
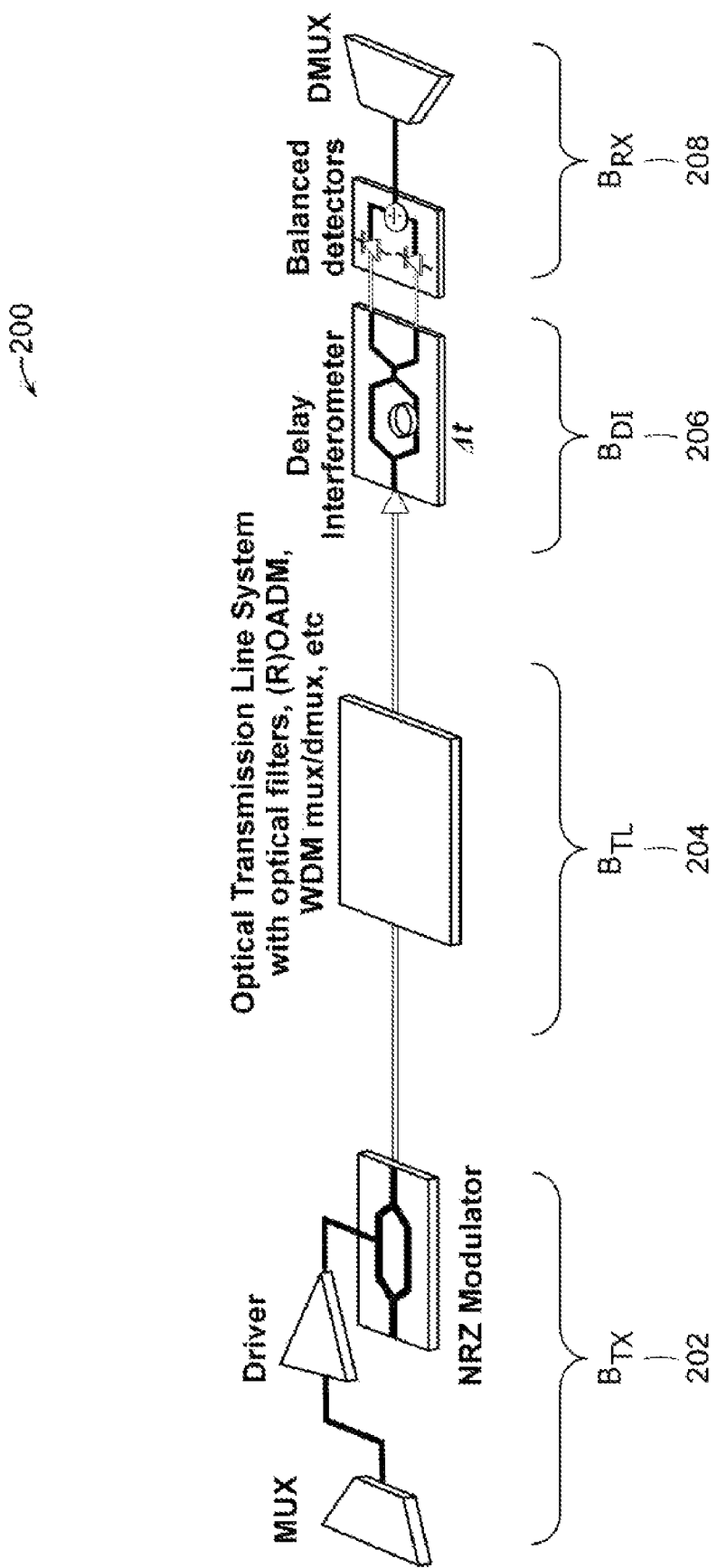
FIG. 2 shows a schematic diagram of a PDPSK transmission system that illustrates individual bandwidths of the various transmission system components.

FIG. 2 shows a schematic diagram of a PDPSK transmission system 200 that illustrates individual bandwidths of the various transmission system components. Referring to both FIG. 1 and FIG. 2, the schematic diagram of the transmission system 200 illustrates a transmitter bandwidth ($B_{TX}$) 202 that corresponds to the bandwidth of the transmitter 102. The transmitter bandwidth ($B_{TX}$) 202 includes the bandwidth of any transmitter components, such as any NRZ modulator 116 and RZ modulators 120 and any data formatting and driving circuits 106, 108, 110, and 112).

Also, the schematic diagram of the PDPSK transmission system 200 illustrates the optical transmission line bandwidth ($B_{TL}$) 204. The optical transmission line bandwidth ($B_{TL}$) 204 includes the bandwidth of the various components along the transmission line system, such as any optical filters, any Optical Add-Drop Multiplexers (OADMs) or Reconfigurable Optical Add-Drop Multiplexers (ROADMs), WDM multiplexers and WDM demultiplexers.

An optical transmission system is considered bandwidth limited when the frequency components furthest away from the center frequency of the transmitted spectrum generated by the transmitter are removed as the signal is transmitted from the transmitter to the receiver. The optical transmission line bandwidth ($B_{TL}$) is considered "wide" or "narrow" depending on the relationship between the transmission line bandwidth and the bandwidth of the signal from the transmitter. The bandwidth of a baseband data signal is approximately equal to one divided by its symbol time slot. The bandwidth of a signal modulated onto a carrier wavelength is two times its baseband bandwidth, meaning that the bandwidth of a data signal modulated onto an optical carrier wavelength is approximately two times its symbol rate. Therefore, the transmission line bandwidth is considered "narrow" when it is smaller than approximately two times the symbol rate of the transmitter.

Also, the schematic diagram of the PDPSK transmission system 200 illustrates the demodulator bandwidth which, for the embodiment shown in FIG. 1, is the bandwidth, e.g the FSR, associated with the delay interferometer ($B_{DI}$) 206. In addition, the schematic diagram 200 of the PDPSK transmission system 200 illustrates the receiver bandwidth ($B_{RX}$) 208, which, for the embodiment shown in FIG. 1, includes the bandwidth of the differential receiver 144 and the input stage of the Demux 150.

The present invention is in part the realization that transmission system performance metrics, such as pre-FEC bit error statistics, OSNR receiver sensitivity, dispersion tolerance can be optimized by changing the delay interferometer bandwidth ($B_{DI}$) 204 in response to changes in at least one other system component bandwidth. That is, transmission system performance metrics can be optimized by changing the delay interferometer bandwidth ($B_{DI}$) 204 in response to changes in at least one of the transmitter bandwidth ($B_{TX}$) 202, the transmission line bandwidth ($B_{TL}$) 204, and the receiver bandwidth ($B_{RX}$) 208. In other words, the individual component bandwidths, $B_{TX}$ 202, $B_{TL}$ 204, $B_{DI}$ 206, and $B_{RX}$ 208 are partial bandwidths of a total effective transmission system bandwidth. Thus, in order to achieve optimum transmission system performance metrics, a change in the bandwidth of one of the transmission system components must be compensated for by a change in the bandwidth of at least one other component.

For example, in order to achieve optimum transmission system performance metrics, such as pre-FEC bit error statistics, OSNR receiver sensitivity, and tolerance to dispersion, when at least one of the transmission system component bandwidths, $B_{TX}$ 202, $B_{TL}$ 204, $B_{DI}$ 206, and $B_{RX}$ 208 is decreased, at least one other transmission system component bandwidth must be increased. In practical high data rate transmission systems, at least one of the transmitter bandwidth ($B_{TX}$) 202, the transmission line bandwidth ($B_{TL}$) 204, and the receiver bandwidth ($B_{RX}$) 208 is likely to be reduced. Therefore, in order to achieve at least one optimum transmission system performance metric, the delay interferometer bandwidth ($B_{DI}$) 206 must be increased. The delay interferometer bandwidth, e.g. the FSR, ($B_{DI}$) 206 can be increased by choosing the delay ($\Delta t$) of the delay interferometer to be less than T, where T=1/B is the symbol time slot, and B is the symbol rate. It has been determined both by simulations and by experiments that choosing a delay of the delay interferometer to be less than T can improve pre-FEC bit error statistics, OSNR receiver sensitivity, and tolerance to dispersion in the transmission system.

Achieving optimum transmitter performance metrics, such as pre-FEC bit error statistics, OSNR receiver sensitivity, and dispersion tolerance according to the present invention can also be explained in terms of the free spectral range (FSR) of the delay interferometer 132. The optimal FSR of the delay interferometer 132 depends on the degree of optical filtering performed in the entire transmission system and on the degree of chromatic dispersion. In spectrally efficient transmission systems, such as transmission systems with tight spectral filtering of the transmitted signals, the optimal FSR of the delay interferometer 132 for optimizing many transmission system performance metrics is larger than the symbol rate of the signal. That is, in transmission systems with bandwidth limiting devices, such as reconfigurable optical add-drop multiplexers (ROADMs), optical mux/demux interleavers, and bandwidth limiting devices in the transmitter electronics, optical modulators, receiver electronics, and detectors, the optimal FSR of the delay interferometer 132 for optimizing many transmission system performance metrics is larger than the symbol rate of the signal.

It should be understood that the delay interferometer 132 of the present invention can be embodied as a delay interferometer 132 with a fixed optical delay that is chosen for a particular optical receiver performance. Alternatively, it should be understood that delay interferometer 132 of the present invention can be embodied as a delay interferometer 132 with the variable delay 134 that provides a means to adjust the optical delay to change the performance of the optical receiver or to provide a means for the system to adapt to changing channel conditions or changing transmission and reception conditions.

Furthermore, the performance of optical receivers according to the present invention can be optimized by changing the ratio of the optical power of the optical signal propagating from the constructive port 136 relative to the optical power of the optical signal propagating from the destructive port 138 of the delay interferometer 132. The ratio of the optical power of the optical signal propagating in the constructive port 136 relative to the optical power of the optical signal propagating in the destructive port 138 can be changed by using at least one of a fixed or a variable attenuator and/or a variable amplifier as described in FIGS. 3A-3C. Thus, in one aspect of the present invention, the PDPSK receiver of the present invention is an adaptive receiver that changes at least one of the optical delay in the delay interferometer 132 and the gain and/or attenuation in at least one arm of the differential receiver 144 in response to changing transmission system condition. The adaptation scheme described herein can be performed at installation and subsequently fixed, continuously during operation of the system, or can be pre-set from factory.

Figure 3A:
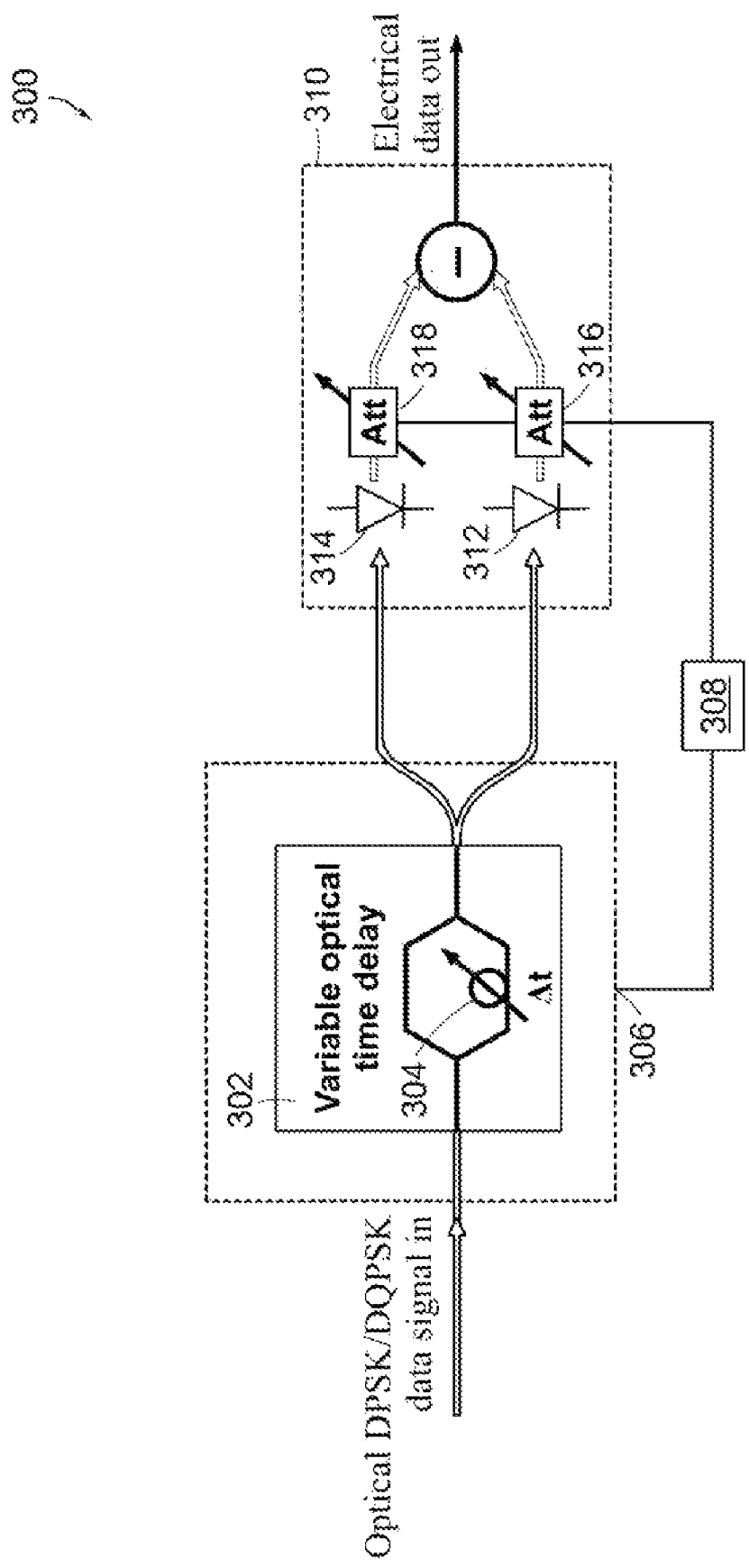
FIGS. 3A-3C illustrate schematic diagrams of adaptive PDPSK receivers according to the present invention.
Figure 3B:
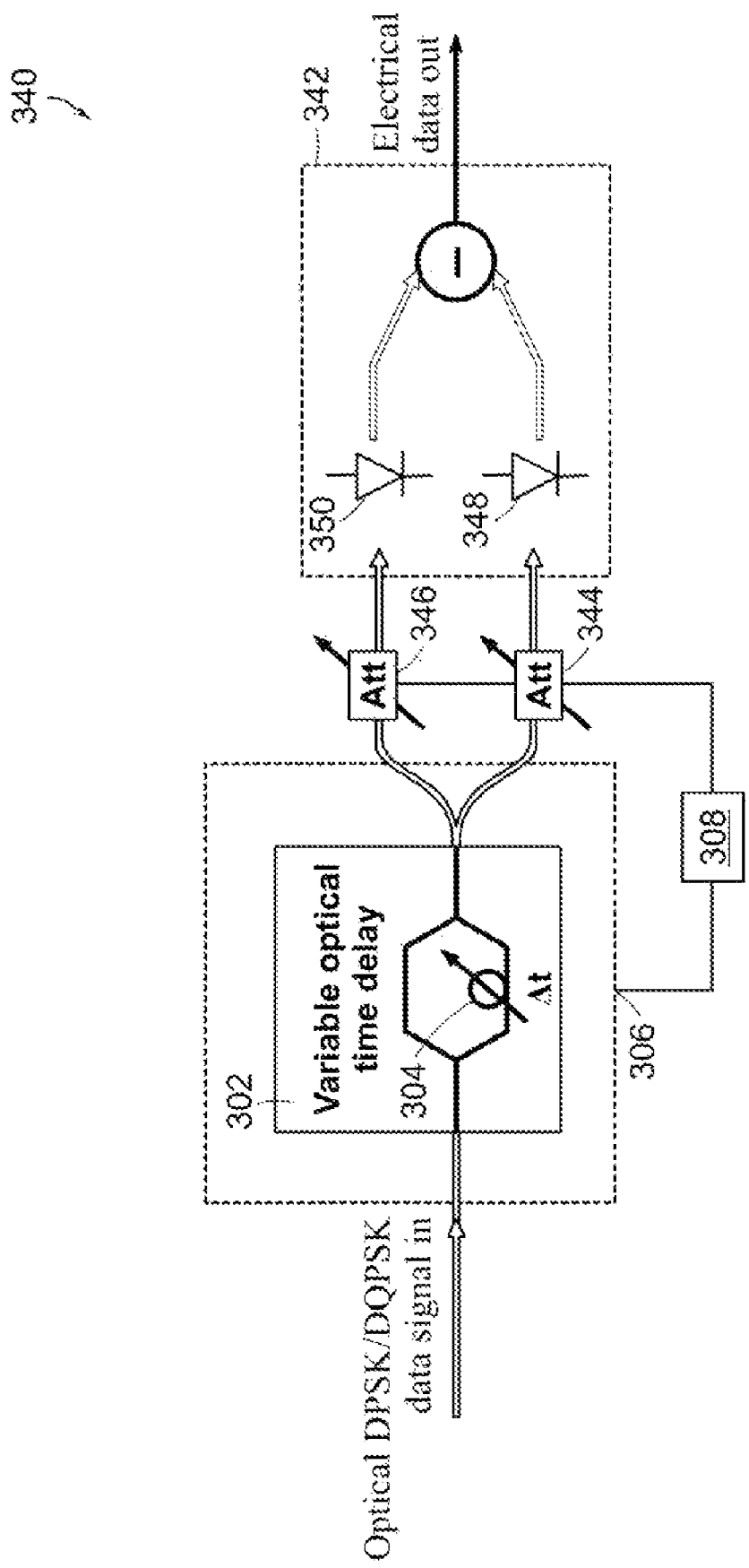
Figure 3C:
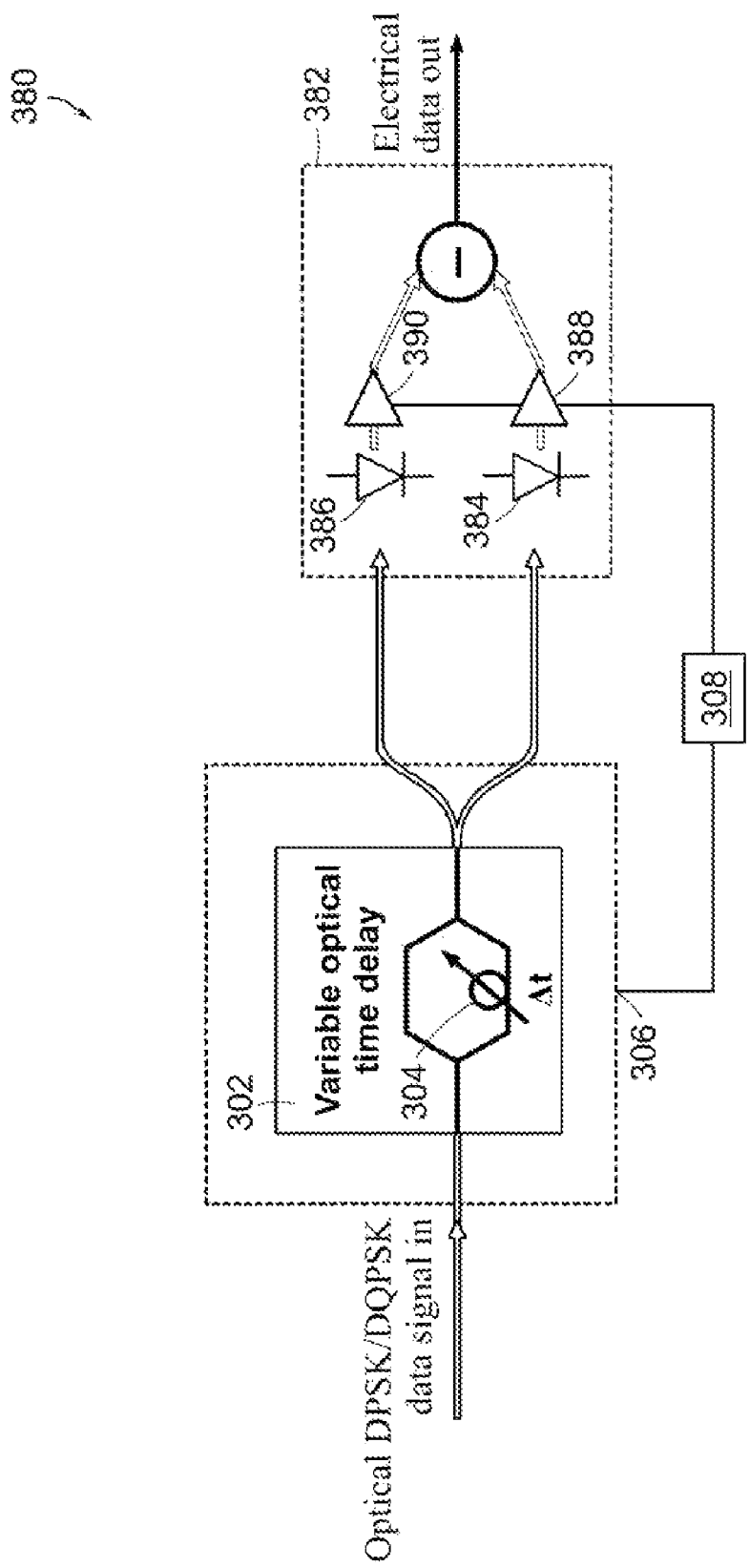

FIGS. 3A-3C illustrate schematic diagrams of adaptive PDPSK receivers 300, 340, 380 according to the present invention. The term "adaptive receiver" is defined herein to mean a receiver that adapts or changes in response to changes in the channel or changes in the transmitter and/or the receiver. In this aspect of the present invention, the PDPSK receivers 300, 340, 380 all include a delay interferometer 302 with a variable optical delay 304 that can be adjusted to change or tune the FSR of the delay interferometer 302. The FSR of the delay interferometer 302 is changed or tuned in response to various changes in the channel or transmission line and/or changes in the transmitter and the receiver, such as changes in filtering anywhere along the transmission path. The variable optical delay 304 includes a control input 306 for controlling the level of optical delay. The control input 306 is electrically connected to an output of a control circuit or processor 308 that generates a control signal related to the current transmission system conditions, such as the transmitter bandwidth, ($B_{TX}$) 202, the transmission line bandwidth ($B_{TL}$) 204, and the receiver bandwidth ($B_{RX}$) 208 (see FIG. 2).

The adaptive PDPSK receivers 300, 340, 380 shown in FIGS. 3A-3C also include a means to adjust signal levels in each arm of the differential receivers. FIG. 3A 300 shows a differential receiver 310 that includes a balanced detector having a first 312 and second photodiode 314 in a respective one of a first and second arm of the differential receiver. A first 316 and second attenuator 318 is electrically coupled to an output of a respective one of the first 312 ad second photodiode 314. The first 316 and second attenuator 318 are adjustable so as to change the signal contributions from the first 312 and second photodiode 314 by adding electrical attenuation. In some embodiments, the processor 308 generates a control signal related to the current transmission system conditions to control the level of attenuation provided by the first 316 and second attenuator 318.

FIG. 3B shows an adaptive PDPSK receiver 340 that includes a differential detector 342. A first 344 and second optical attenuator 346 is optically coupled between the delay interferometer 302 and a respective one of a first 348 and second photodiode 350 in the differential detector 342. The first 344 and second optical attenuator 346 are adjustable so as to change the signal contributions from the first 348 and second photodiode 350 by adding optical attenuation in one arm of the differential receiver 340.

FIG. 3C shows an adaptive PDPSK receiver 380 that includes a differential receiver 382 having a first 384 and second photodiode 386 in a respective one of a first and second arm of the differential receiver 380. A first 388 and second electronic amplifier 390 is electrically coupled to an output of a respective one of the first 384 and second photodiode 386. The first and second electronic amplifiers 388, 390 are adjustable so as to change the signal contributions from the first 384 and second photodiode 386 by adding electrical gain.

In operation, a control signal is generated by the processor 308 from measurements of transmission system parameters and metrics. These transmission system parameters and metrics can be related to the bandwidth of the various transmission system components or to the level of dispersion in the transmission system. The control signal is applied to the control input 306 of the variable optical delay 302. The adaptive PDPSK receivers 300, 340, 380 then adjust the FSR of the variable optical delay 306 of the delay interferometer 302 in response to the control signal applied to the control input 306. In some embodiments, a control signal is generated that changes the FSR of the variable optical delay 306 automatically to optimize a certain performance metric, such as a pre-FEC bit error statistic, OSNR receiver sensitivity, and/or dispersion tolerance. In some embodiments, the control signal changes the FSR of the variable optical delay 306 in a continuously tunable manner. In other embodiments, the control signal changes the FSR of the variable optical delay 306 between predetermined values of FSR.

It should be understood that the methods and apparatus of the present invention can be applied to any type of phase modulation system, such as DPSK/DQPSK transmission systems, including DXPSK transmission systems where X=2, 4, 8, 16 . . . . Furthermore, the methods and apparatus of the present invention can use either an NRZ type or an RZ type modulation format. Also, it should be understood that the methods and apparatus of the present invention can be applied to any type of transmission system. Furthermore, The PDPSK transmission systems according to the present invention have been shown to have improved OSNR receiver sensitivity over known DPSK/DQPSK transmission systems.

Improvements have been demonstrated with both RZ-type and NRZ-type transmission formats. The simulations and experimental results presented herein are for a symbol rate of 43 Gb/s. However, it is understood that the methods and apparatus of present invention can be practiced at any symbol rate. However, the methods and apparatus of present invention can significantly enhance receiver performance metrics compared with known systems at data rates that are at 43 Gb/s data and higher.

Figures 2, 4A:
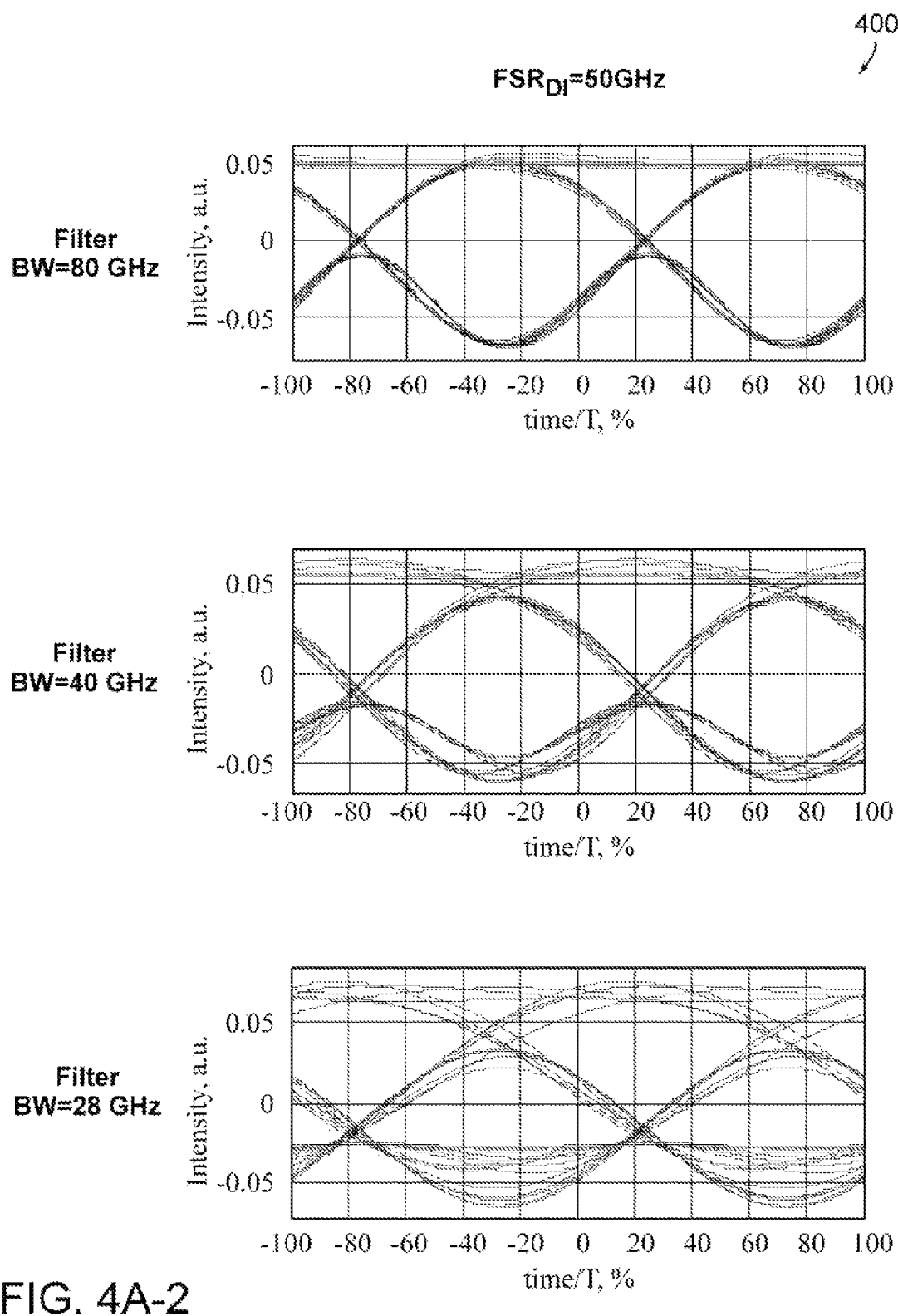
FIG. 4A presents calculated data for electrical eye diagrams of NRZ PDPSK signals for three different levels of optical filtering and for three different values of the delay interferometer FSR in a transmission system according to the present invention.
Figures 3, 4A:
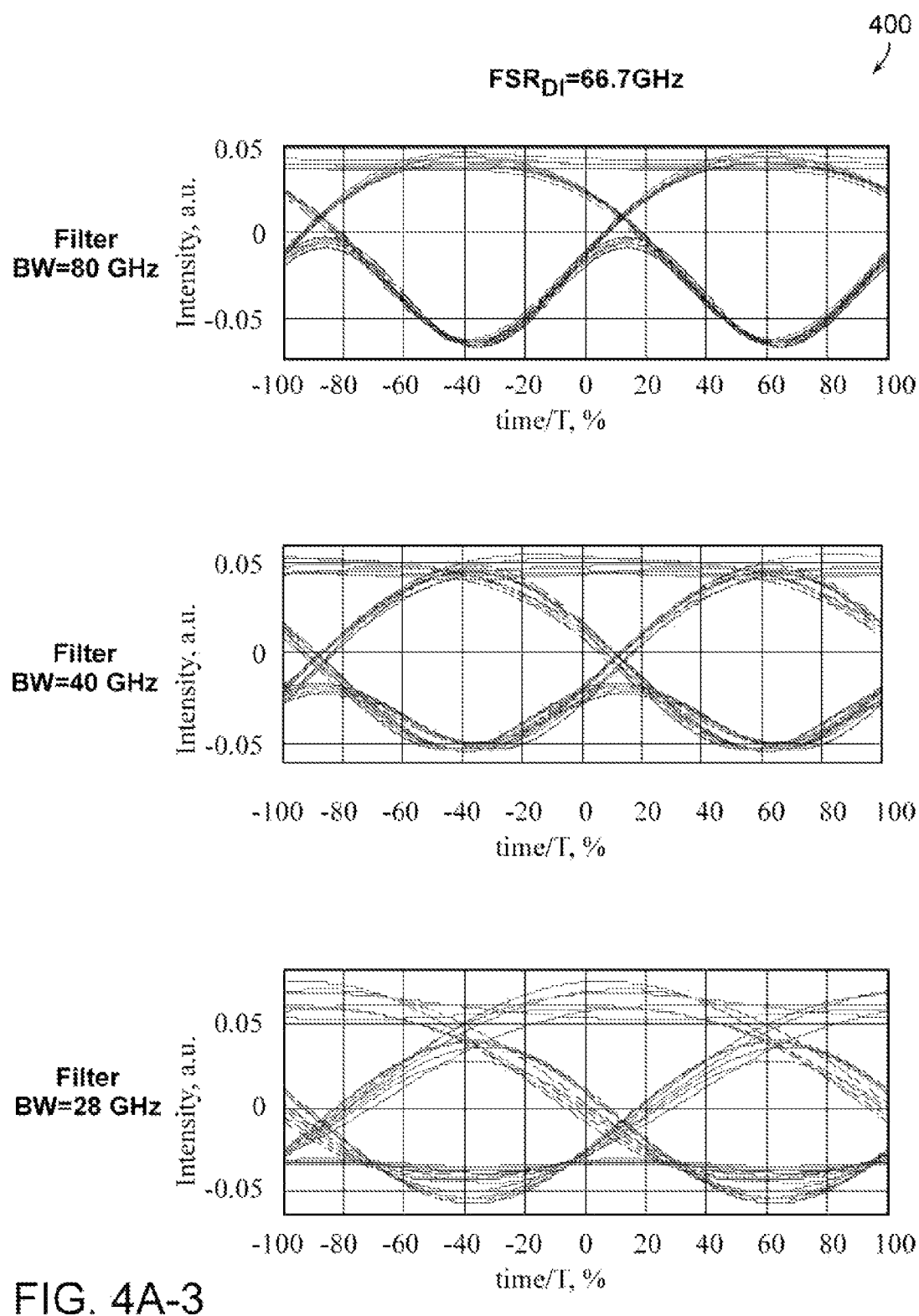
Figures 2, 4B:
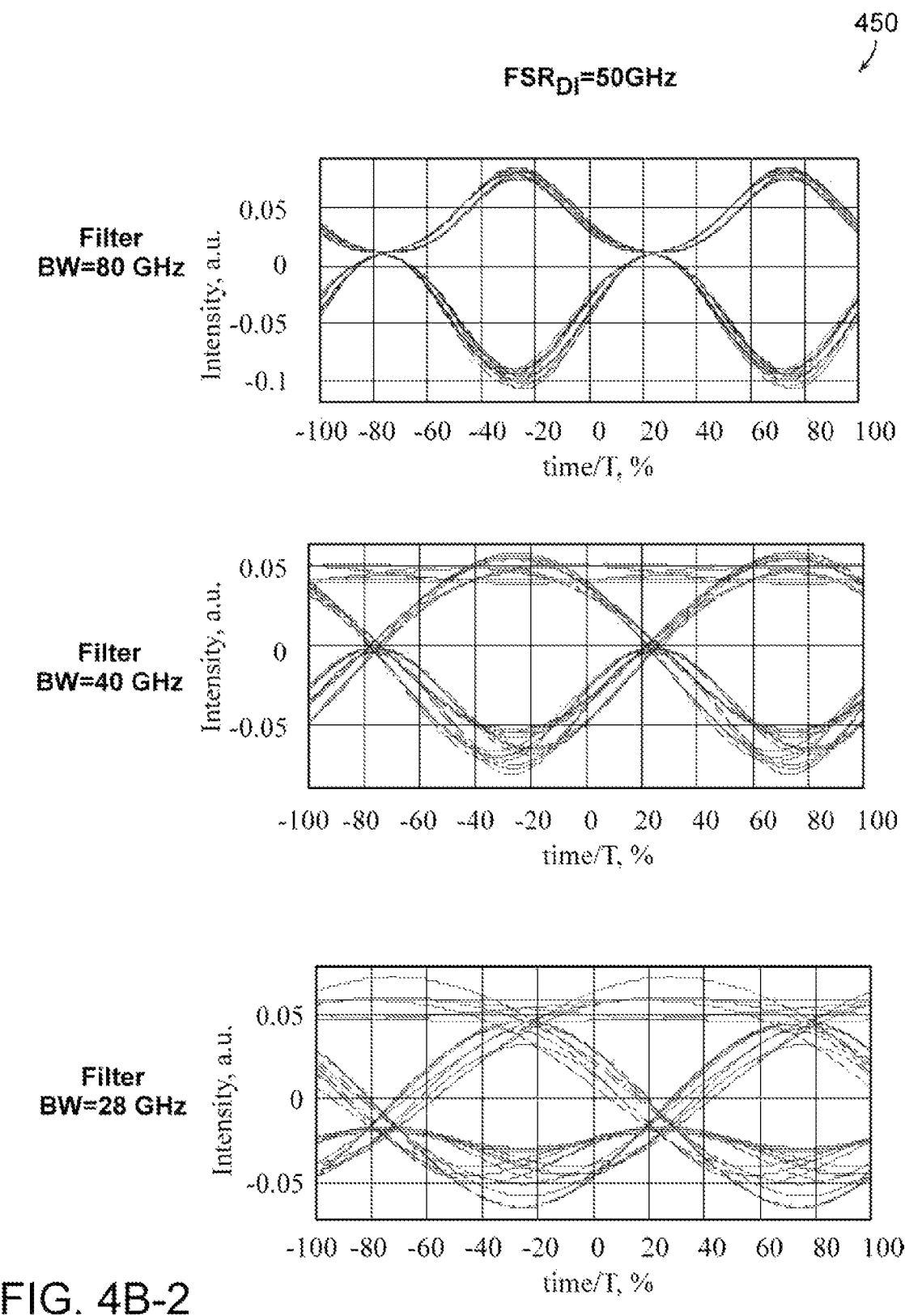
FIG. 4B presents calculated data for electrical eye diagrams of RZ PDPSK signals for three different levels of optical filtering and for three different values of the delay interferometer FSR in a transmission system according to the present invention.
Figures 3, 4B:
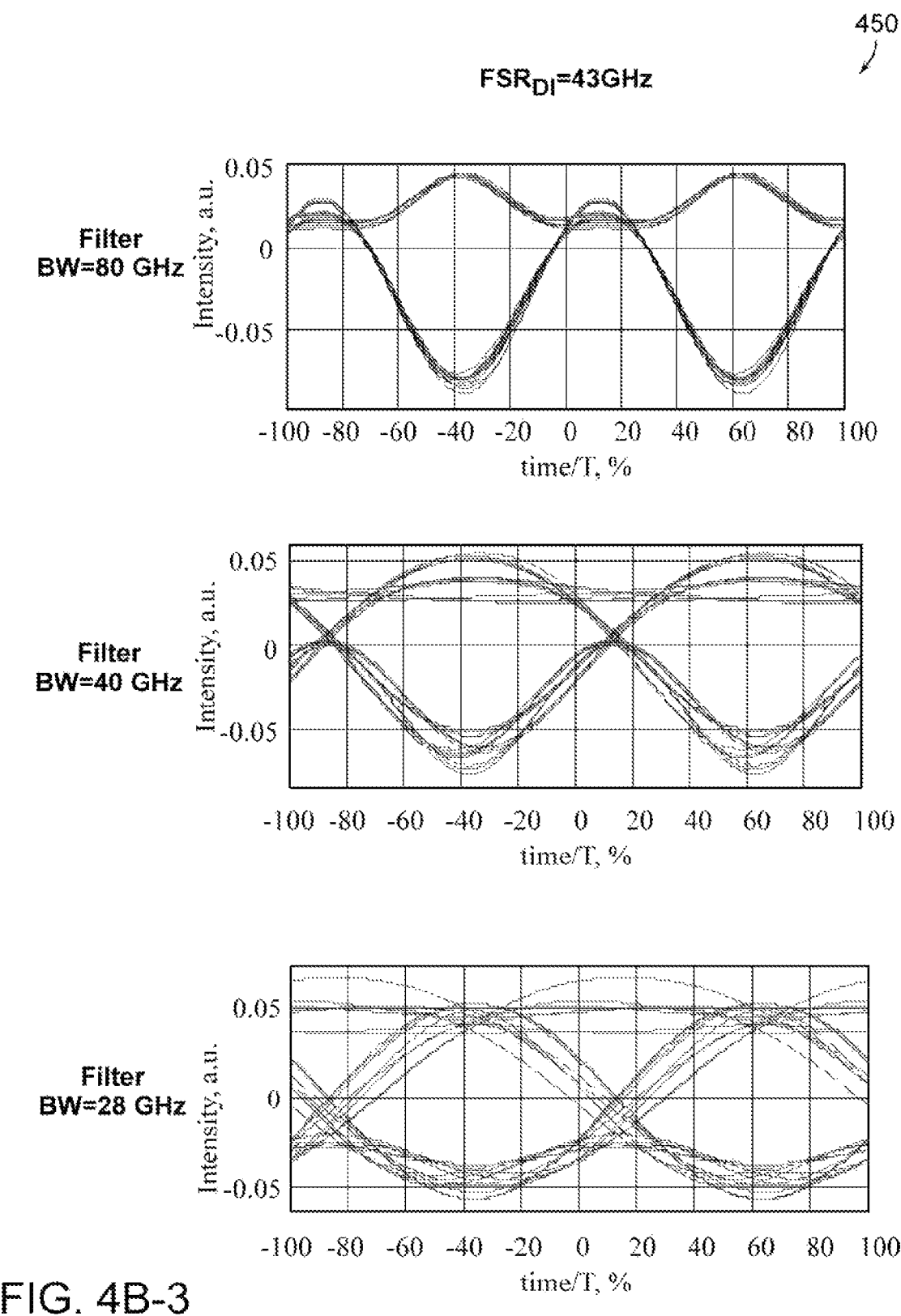

FIG. 4A presents calculated data 400 for electrical eye diagrams of NRZ PDPSK signals for three different levels of optical filtering and for three different values of the delay interferometer FSR in a transmission system according to the present invention. FIG. 4B presents calculated data 450 for electrical eye diagrams of RZ PDPSK signals for three different levels of optical filtering and for three different values of the delay interferometer FSR in a transmission system according to the present invention. A second order super-Gaussian optical filter transfer function was used in the simulations.

The eye diagram data 400, 450 presented in FIGS. 4A and 4B indicate that when the FSR of the delay interferometer 132 (FIG. 1) of the receiver is equal to the 43 GHz symbol rate, a wide-open eye diagram is obtained when the optical filtering in the transmission system is weak (not strong filtering). A wide-open eye diagram indicates a low bit error rate and a high OSNR receiver sensitivity, which is desirable for such transmission systems. The term "strong filtering," which is also known in the art as "tight filtering," is defined herein as narrow passband filtering. The 28 GHz bandwidth filtering shown in FIG. 4 is stronger filtering than the 40 GHz bandwidth filtering, which is stronger than the 80 GHz filtering. In contrast, the data 400, 450 presented in FIGS. 4A and 4B indicate that when the FSR of the delay interferometer 132 is equal to the 43 GHz symbol rate with strong optical filtering, a more closed eye diagram is obtained. The more closed eye diagram indicates a higher bit error rate for a fixed signal-to-noise ratio compared with an open eye diagram.

The data 400, 450 presented in FIGS. 4A and 4B also indicate that when the FSR of the delay interferometer 132 (FIG. 1) of the receiver is larger than the symbol rate (i.e. $FSR_{DI}$, equal to 50 GHz and 66.7 GHz), more distortion in the eye diagrams is present when the filtering is weak (i.e. filter BW=80 GHz) compared with receivers where the FSR of the delay interferometer 132 is equal to the 43 GHz symbol rate. The increased distortion indicates that the bit error rate has increased for a fixed signal-to-noise ratio.

Furthermore, the data 400, 450 presented in FIGS. 4A and 4B indicates that when the FSR of the delay interferometer 132 (FIG. 1) of the receiver is larger than the symbol rate (i.e. $FSR_{DI}$, equal to 50 GHz and equal to 66.7 GHz) and the optical filtering is strong, the eye diagrams are more open and show less distortion compared with receivers where the FSR of the delay interferometer 132 is equal to the 43 GHz symbol rate. The lower distortion indicates a lower bit error rate at a fixed signal-to-noise ratio. These data visually illustrate the performance benefit that can be achieved by using the method and apparatus of the present invention in transmission systems with strong filtering. The bit error rate can be improved in such systems by using a delay interferometer 132 with a differential delay that is less than one bit-period or equivalently, a FSR that is larger than the symbol rate.

Figure 5:
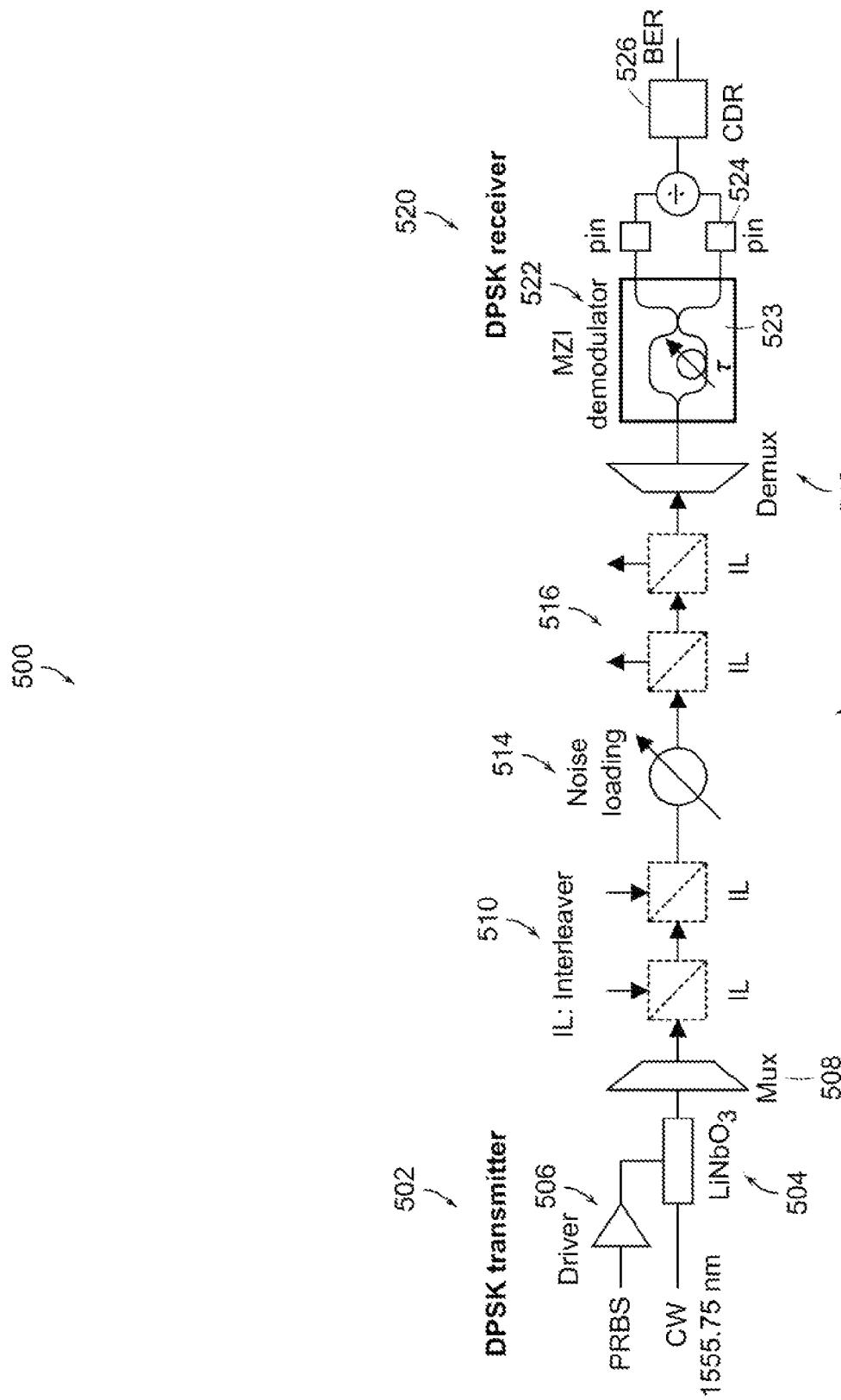
FIG. 5 illustrates a schematic diagram of an experimental transmission system used to measure eye diagrams and OSNR sensitivity data for transmission systems according to the present invention.

FIG. 5 illustrates a schematic diagram of an experimental transmission system 500 used to measure eye diagrams and OSNR sensitivity data for transmission systems according to the present invention. The transmission system 500 includes a DPSK transmitter 502 comprising an electro-optic modulator 504. A plurality of modulators can be used to transmit data at different wavelengths. A driver 506 is coupled to a modulation input of the modulator 504. The driver 506 receives a pseudo-random bit sequence (PRBS) and then adjusts the level of the signal to a suitable level for modulation. The driver 506 then applies the PRBS to the modulators 504.

A multiplexer 508 is optically coupled to the output of the modulators 504. The multiplexer 508 can multiplex a plurality of optically modulated signals onto a single output optical signal. An output of the multiplexer 508 is optically coupled to first interleaving devices 510. The first interleaving devices 510 are narrow-band filter. For the experiments describe herein, the interleaving devices are filters having a super-Gaussian shape. The FWHM bandwidth of these super-Gaussian shaped filters was ~42 GHz. Cascading two of these super-Gaussian shaped filters resulted in a ~35 GHz BW, and cascading four of them resulted in a ~28 GHz BW.

An adjustable noise load 514 is coupled to the output of the first interleaving devices 510. The output of the adjustable noise load 514 is coupled to second interleaving devices 516. The second interleaving devices 516 are also narrow-band filters. The output of the transmission line 512 is optically coupled to an input of a demultiplexer 518. The demultiplexer 518 demultiplexes the optical signals into a plurality of optical signals each with a different wavelength.

The transmission system 500 also includes a DPSK receiver 520 comprising a demodulator 522. The demodulator 522 includes the delay interferometer 523 that was described in connection with FIG. 1. The differential output of the demodulator 522 is optically coupled to differential inputs of a differential detector 524. The differential detector 524 generates a received signal at an output. Measurement equipment 526 is electrically connected to the output of the differential detector 524. The measurement equipment is used to measure the experimental results, such as the eye diagrams and OSNR data that are presented in the following figures.

Figure 6:
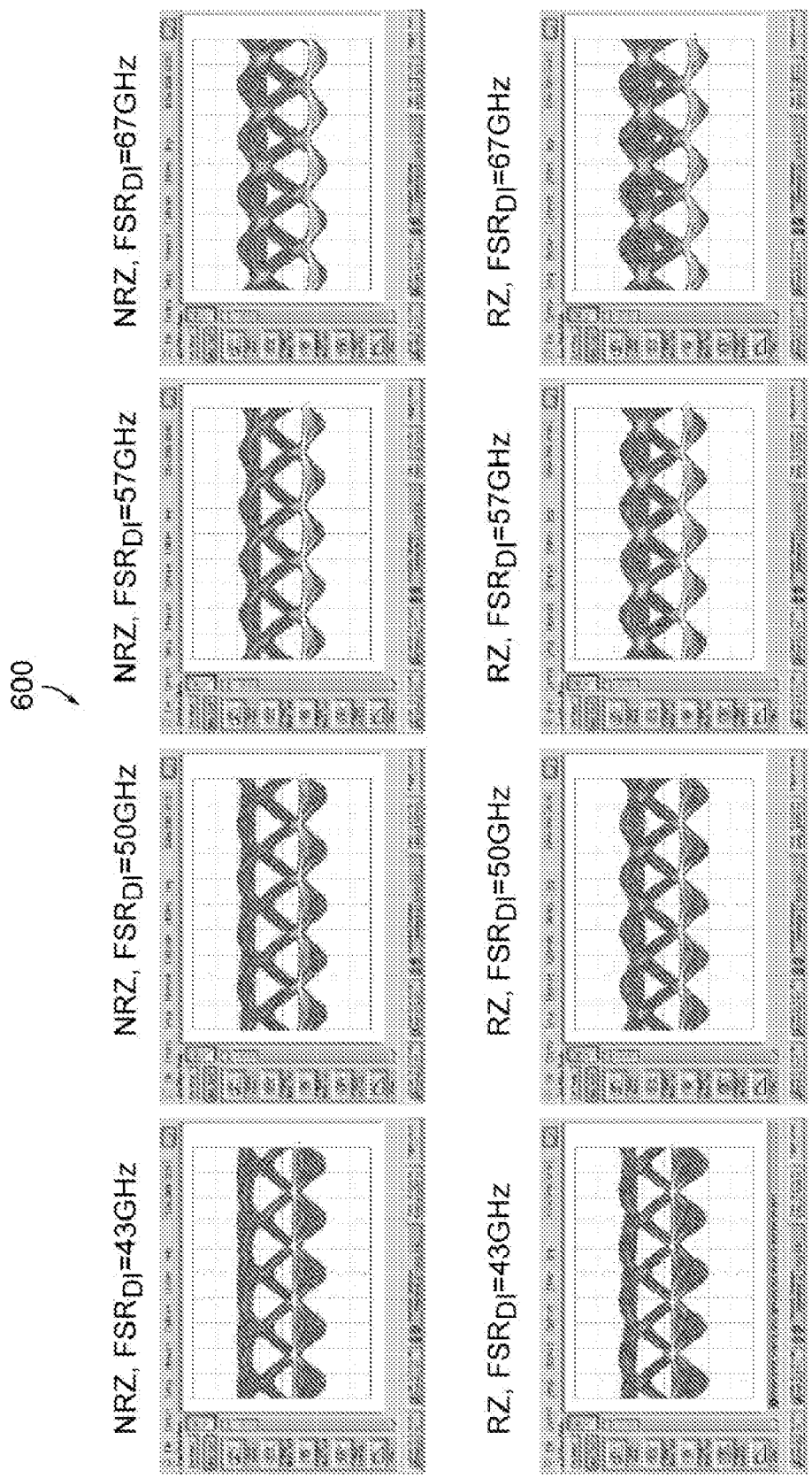
FIG. 6 presents experimental data for electrical eye diagrams of NRZ and RZ signals for four different values of the delay interferometer FSR in a transmission system according to the present invention.

FIG. 6 presents experimental data for electrical eye diagrams 600 of NRZ and RZ signals for four different values of the delay interferometer FSR in a transmission system where strong optical filtering is applied to the signals by cascading four optical filters to provide a combined FWHM of 28 GHz. Electrical eye diagrams are shown for NRZ and RZ signals received by a conventional DPSK receiver having a delay interferometer with a FSR that is equal to the symbol rate and also for a PDPSK receiver according to the present invention having a delay interferometer with a FSR that is larger than the symbol rate as describe in the present invention.

The electrical eye diagrams 600 visually indicate that the conventional DPSK receiver has more inter-symbol interference for both NRZ and RZ signals compared with the PDPSK receivers according to the present invention. The electrical eye diagrams for the PDPSK receivers according to the present invention show significantly more open eye diagrams. The electrical eye diagrams also visually indicate that there must be an optimum FSR for the delay interferometer 523 in the demodulator 522 of the transmission system 500 (FIG. 5). The PDPSK receivers with the delay interferometer FSRs equal to 57 GHz appear to have less distortion for both NRZ and RZ signals than the PDPSK receivers with delay interferometer FSRs equal to 67 GHz.

Thus, the electrical eye diagrams 600 indicate that for a transmission system with a particular number of filters, or equivalently, for a transmission system with a specific effective filtering, there can be an optimum value of delay interferometer FSR in the PDPSK receiver that corresponds to an optimum receiver performance. One skilled in the art will understand that both simulations and experiments can be performed to determine the optimum delay interferometer FSR for a demodulator according to the present invention, which corresponds to the optimum receiver performance in any particular range of effective transmission system filtering.

Figure 7A:
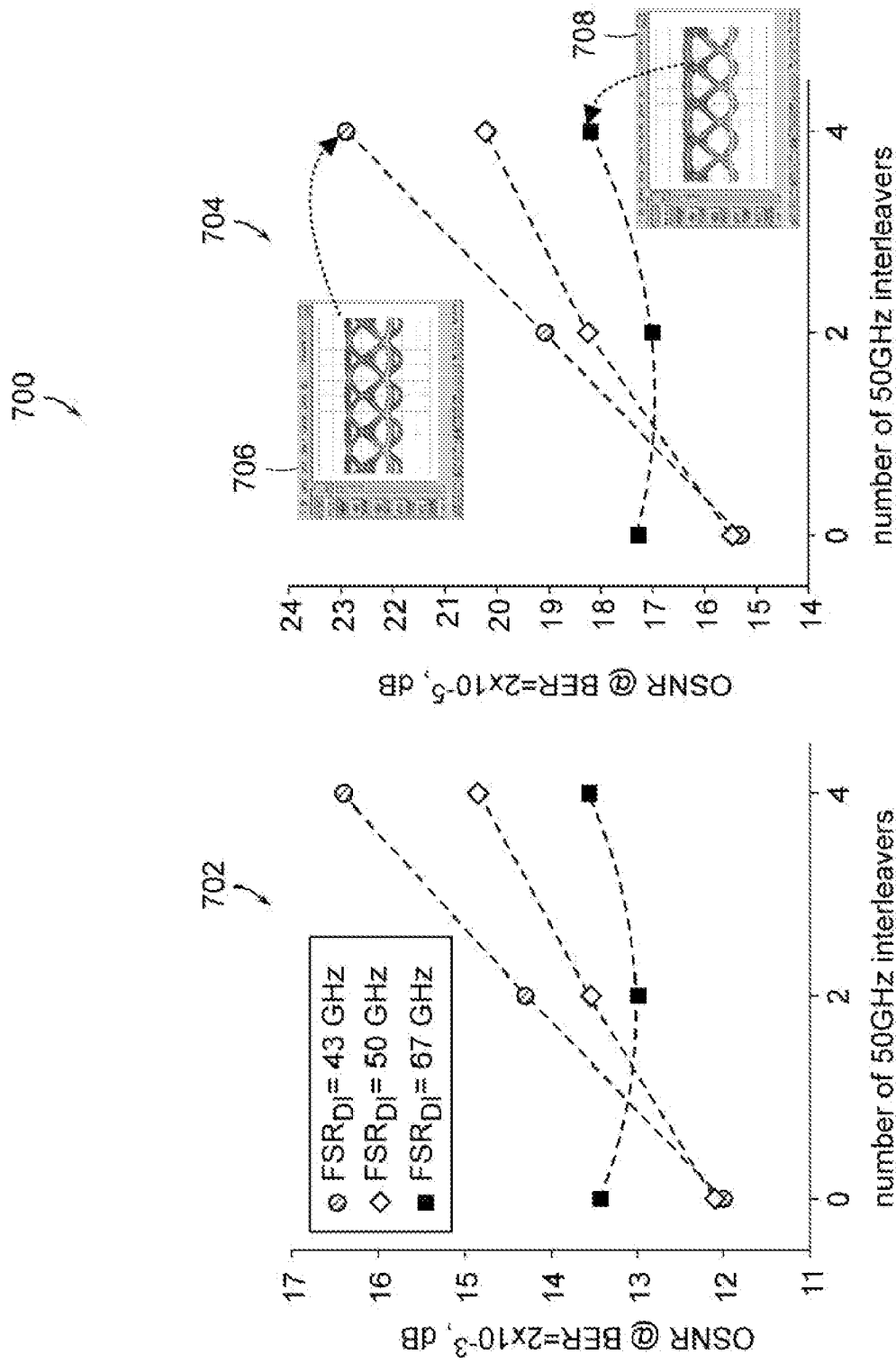
FIG. 7A presents experimental OSNR sensitivity data for a NRZ DPSK signal received with a conventional DPSK receiver and with a PDPSK receiver according to the present invention.

FIG. 7A presents experimental OSNR sensitivity data 700 for a NRZ DPSK signal received with a conventional DPSK receiver and with a PDPSK receiver according to the present invention. FIG. 7A shows the required receiver OSNR to achieve a certain fixed bit error rate as a function of the number of 50 GHz interleavers. The interleavers are narrowband filters as described in connection with FIG. 5. The graph 702 presents OSNR data in dB for a $2\times10^{-3}$ bit error rate as a function of the number of 50 GHz interleavers. A BER of $2\times10^{-3}$ is typically converted to a BER of less than $1\times10^{-15}$ after forward error correction. The graph 702 shows that a PDPSK receiver does not require as high an OSNR as a conventional DPSK receiver to achieve a certain BER.

The graph 704 presents experimental OSNR data in dB for a $10^{-5}$ bit error rate as a function of the number of 50 GHz interleavers. An eye diagram 706 is presented for a signal received with a conventional DPSK receiver with four 50 GHz interleavers. In comparison, an eye diagram 708 is presented for a signal received with a PDPSK receiver according to the present invention with a FSR equal to 67 GHz with four 50 GHz interleavers. The eye diagram 708 for the signal received with the PDPSK receiver according to the present invention appears more open than the eye diagram 706 for a signal received with a conventional DPSK receiver, which indicates less distortion in the signal received signal by the PDPSK receiver according to the present invention. The graph 704 shows that a PDPSK receiver does not require as high an OSNR as a conventional DPSK receiver in order to achieve a certain BER.

Figure 7B:
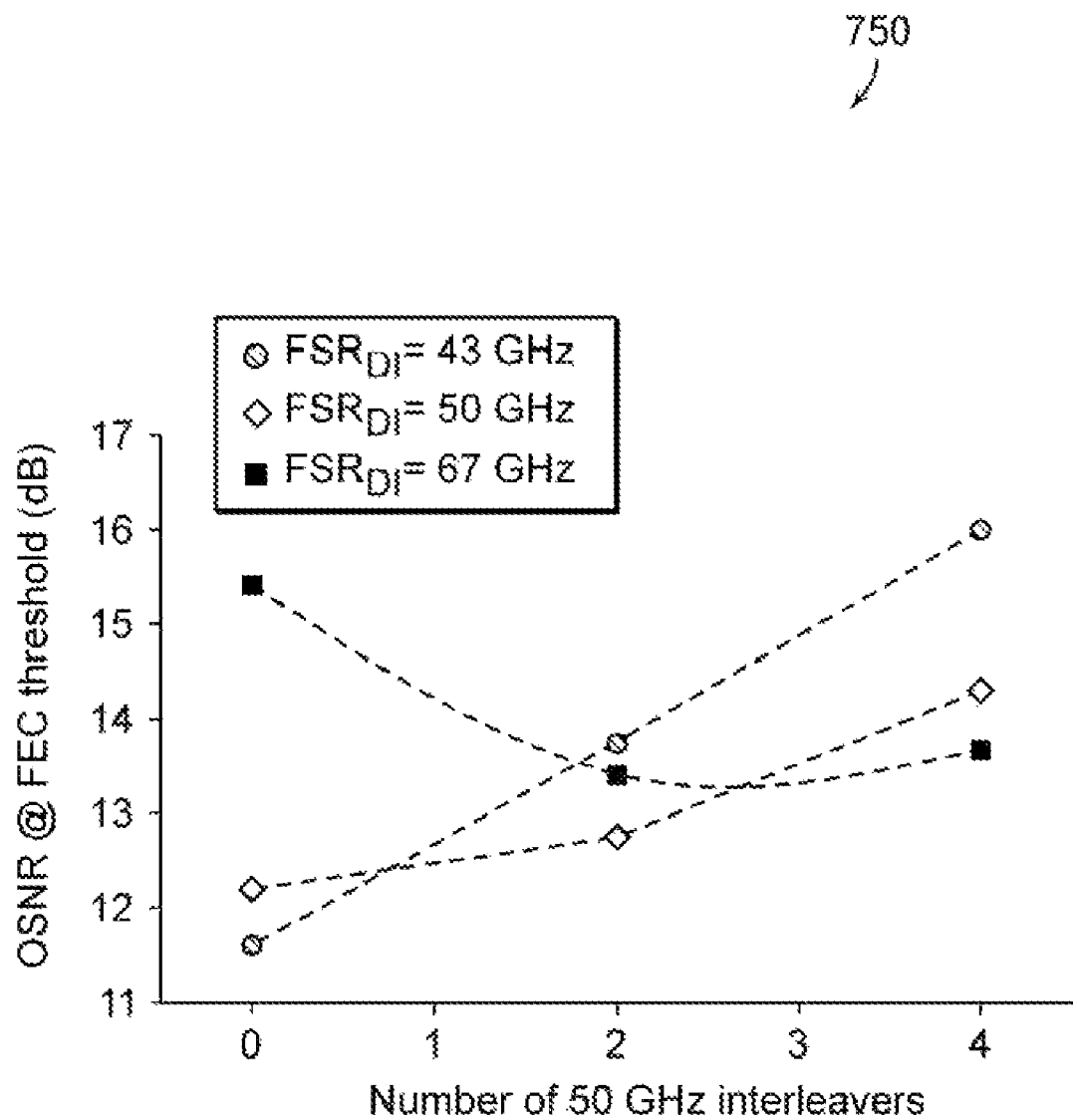
FIG. 7B presents experimental OSNR sensitivity data for a RZ DPSK signal received with a conventional DPSK receiver and with a PDPSK receiver according to the present invention.

FIG. 7B presents experimental OSNR sensitivity data for a RZ DPSK signal received with a conventional DPSK receiver and with a PDPSK receiver according to the present invention. The graph 750 presents the experimental OSNR in dB for the FEC threshold error rate as a function of the number of 50 GHz interleavers. The FEC threshold is the maximum bit error rate level at which the forward error correction circuit can remove errors (i.e., corrected BER is less than $10^{-15}$). The graph 750 shows that a PDPSK receiver does not require as high an OSNR as a conventional DPSK receiver to achieve a certain BER.

Thus, the simulation and experimental data presented in FIGS. 4A, 4B, 6, and 7A and 7B indicate that the method and apparatus of the present invention can achieve improved receiver performance in transmission systems with narrow optical filtering by using the PDPSK receivers according to the present invention with delay interferometers having FSRs that are greater than the symbol rate.

Figures 2, 8A:
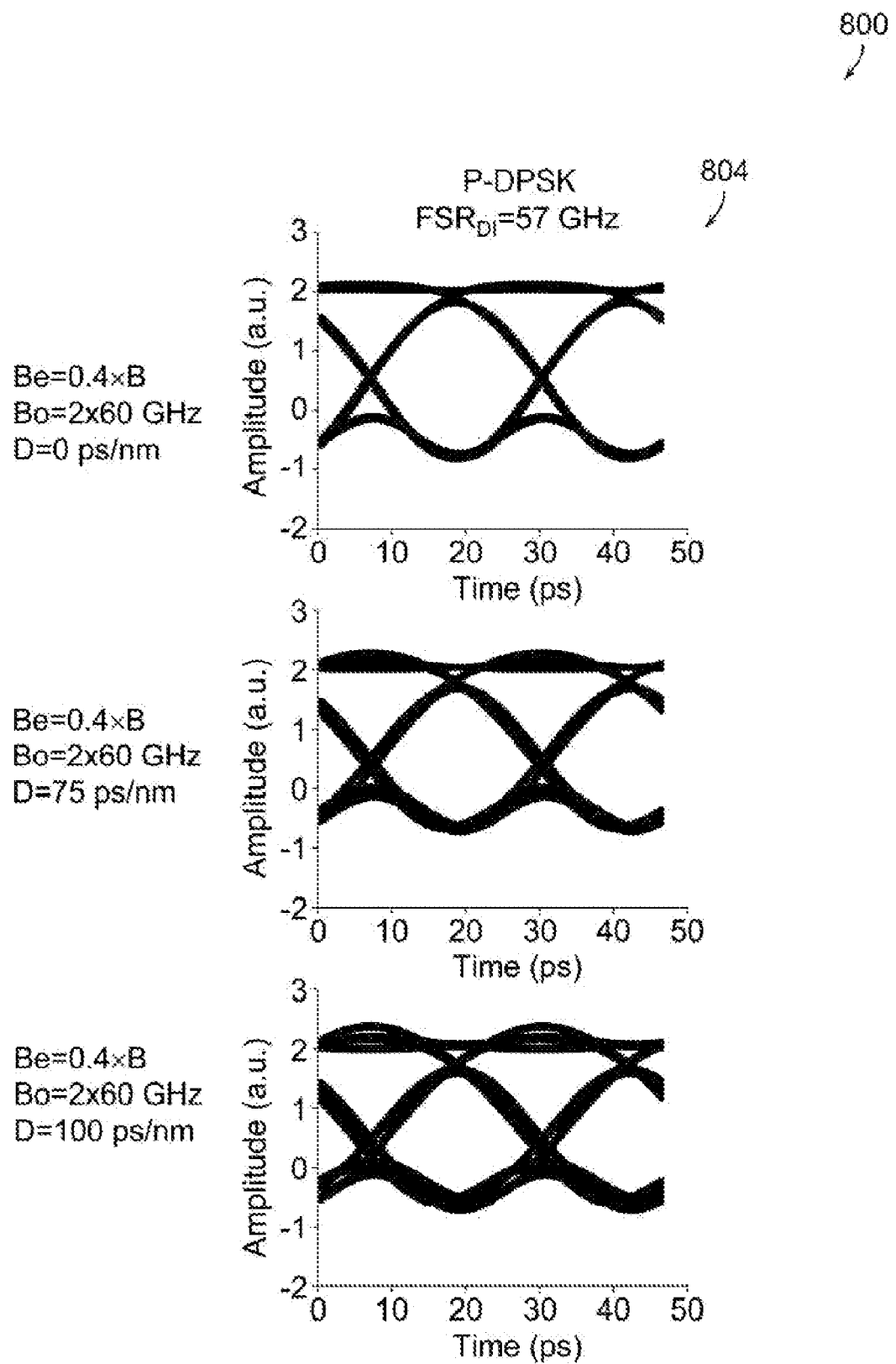
FIG. 8A presents a comparison of calculated eye diagram data for DPSK signals received with a conventional DPSK receiver and received with a PDPSK receiver according to the present invention for various levels of dispersions in the transmission line system.

FIG. 8A presents a comparison of calculated eye diagram data for DPSK signals received with a conventional DPSK receiver and received with a PDPSK receiver according to the present invention for various levels of dispersions in the transmission line system. The calculated eye diagrams 802 are eye diagrams for DPSK signals received with a conventional DPSK receiver with an effective transmitter bandwidth (Be) equal to 0.4 times the symbol rate and with two optical filters inserted in the transmission path, each optical filter having a bandwidth of 60 GHz. The eye diagrams 802 are presented for no dispersion, 75 ps/nm dispersion, and for 100 ps/nm dispersion. The calculated eye diagrams 800 indicate that significantly more distortion is present in the received signal when the dispersion is 75 ps/nm and 100 ps/nm.

Figure 8B:
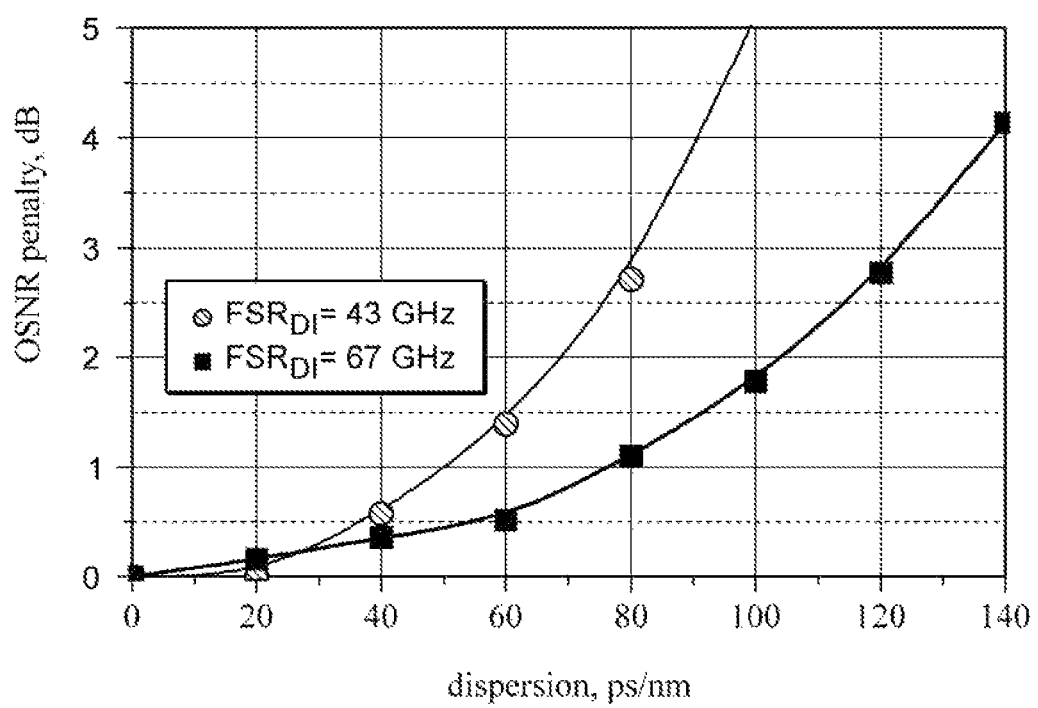
FIG. 8B presents experimental OSNR penalty data in dB for a DPSK signal received with a conventional DPSK receiver and received with a PDPSK receiver according to the present invention for various levels of dispersions in the transmission line system.

The calculated eye diagrams 804 are eye diagrams for DPSK signals received with a PDPSK receiver according to the present invention with an effective transmitter bandwidth (Be) equal to 0.4 times the symbol rate and with two optical filters inserted in the transmission path, each optical filter having a bandwidth of 60 GHz. The calculated eye diagrams 804 are also presented for no dispersion, 75 ps/nm dispersion, and for 100 ps/nm dispersion. The calculated eye diagrams 804 indicate that the dispersion tolerance of receivers according to the present invention is increased under some conditions when the FSR of the delay interferometer is larger than the symbol rate of 43 Gsymbols/s FIG. 8B presents measured OSNR penalty data 850 in dB for a DPSK signal received with a conventional DPSK receiver and received with a PDPSK receiver according to the present invention for various levels of dispersions in the transmission line system. The OSNR penalty data 850 is presented in dB. The OSNR penalty data 850 indicates that the dispersion tolerance of receivers according to the present invention is increased under some conditions when the FSR of the delay interferometer is larger than the symbol rate.

Thus, the calculated eye diagrams 804 and the measured eye diagrams 850 indicate that a dispersion tolerance of ±100 ps/nm is possible by properly choosing the effective transmitter bandwidth $B_e$, the optical filter bandwidth $B_o$, and the delay interferometer FSR. Also, the calculated eye diagrams 804 and the measured OSNR penalty data indicate that the dispersion tolerance is generally higher for a PDPSK receiver where the delay interferometer FSR is greater than the symbol rate. In addition, the calculated eye diagrams 804 and the measured OSNR penalty data indicate that an optimal delay interferometer FSR exists for a given dispersion level, effective transmitter bandwidth ($B_e$), optical filter bandwidth ($B_o$), which is equivalent to $B_{TL}$, and receiver bandwidth ($R_{RX}$) Similar results were obtained for both NRZ-type and RZ-type modulated data. Also, similar results were obtained for positive and negative dispersion.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:
1. An optical receiver comprising:
 a. a demodulator having a delay interferometer comprising an optical input that receives a phase modulated optical signal from a transmission system, a constructive optical output, and a destructive optical output, the delay interferometer configured to have a delay that is less than one symbol slot and that is selected according to a bandwidth of the transmission system, wherein the transmission system has a FWHM bandwidth of an intensity transfer function as seen from a transmitter modulator, which generates the phase modulated optical signal, to the input of the demodulator that is less than twice the symbol rate and wherein an improvement in a performance characteristic of the optical receiver is achieved relative to the performance characteristic for a delay of one symbol slot; and b. a differential detector comprising a first and a second photodetector, the first photodetector being optically coupled to the constructive optical output of the delay interferometer, the second photodetector being optically coupled to the destructive optical output of the delay interferometer, the differential detector combining a first electrical detection signal generated by the first photodetector and a second electrical detection signal generated by the second photodetector to generate an electrical reception signal.

2. The optical receiver of claim 1 wherein the intensity transfer function transfers less than 95% of a signal spectrum of the generated phase modulated optical signal.

3. The optical receiver of claim 1 wherein the delay interferometer comprises at least one of a Mach-Zehnder interferometer and a Michelson interferometer.

4. The optical receiver of claim 1 wherein the delay interferometer comprises an optical input, two optical outputs, and at least one delaying branch positioned between the optical input and the two optical outputs.

5. The optical receiver of claim 1 wherein the delay interferometer provides a variable optical delay that generates a variable free spectral range.

6. The optical receiver of claim 5 wherein the variable optical delay is continuously variable.

7. The optical receiver of claim 5 wherein the variable optical delay is selectable from a plurality of predetermined optical delays.

8. The optical receiver of claim 1 wherein the free spectral range of the delay interferometer is chosen to optimize at least one of an optical signal-to-noise ratio sensitivity of the optical receiver and a bit error rate of the electrical reception signal.

9. The optical receiver of claim 1 further comprising at least one electrical attenuator coupled to at least one of the first and second photodiodes, the at least one electrical attenuator attenuating at least one of the first and second electrical detection signal in order to provide different signal contributions.

10. The optical receiver of claim 1 further comprising at least one optical attenuator coupled to at least one of the constructive optical output and the destructive optical output of the delay interferometer.

11. The optical receiver of claim 1 further comprising at least one electrical amplifier coupled to at least one of the first and second photodiodes, the at least one electrical amplifier amplifying at least one of the first and second electrical detection signal in order to provide different signal contributions.

12. The optical receiver of claim 1 further comprising at least one optical amplifier coupled to at least one of the constructive optical output and the destructive optical output of the delay interferometer.

13. An adaptive optical receiver comprising:
a. a demodulator having a variable delay interferometer comprising an optical input that is configured to receive a phase modulated optical signal from a transmission system, a control input that controls a free spectral range of the variable delay interferometer, a constructive optical output, and a destructive optical output, wherein a FWHM bandwidth of an intensity transfer function as seen from an output of a transmitter in the transmission system, which generates the phase modulated optical signal, to an input of the demodulator is less than twice the symbol rate, the free spectral range of the delay interferometer being larger than the symbol rate of the phase modulated optical signal by an amount that is determined by the control signal applied to the control input to optimize a performance characteristic of the adaptive optical receiver, the control signal being responsive to a bandwidth of the transmission system; and
b. a differential detector comprising a first and a second photodetector, the first photodetector being optically coupled to the constructive optical output of the delay interferometer, the second photodetector being optically coupled to the destructive optical output of the delay interferometer, the differential detector combining a first electrical detection signal generated by the first photodetector and a second electrical detection signal generated by the second photodetector to generate an electrical reception signal.

14. The adaptive optical receiver of claim 13 further comprising a processor that generates the control signal from measurements of at least one of a transmitter bandwidth, a transmission line bandwidth, and a receiver bandwidth.

15. The adaptive optical receiver of claim 14 wherein the processor generates a control signal that improves at least one of an optical signal-to-noise ratio sensitivity of the adaptive optical receiver, a receiver sensitivity and a bit error rate of the electrical reception signal.

16. The adaptive optical receiver of claim 14 wherein the processor generates a control signal that optimizes at least one of an optical signal-to-noise ratio of optical signals propagating through the constructive and destructive optical outputs of the delay interferometer, a receiver sensitivity and a bit error rate of the electrical reception signal.

17. The adaptive optical receiver of claim 13 wherein the delay interferometer comprises at least one of a Mach-Zehnder interferometer and a Michelson interferometer.

18. The adaptive optical receiver of claim 13 wherein the control signal continuously varies the free spectral range of the variable delay interferometer.

19. The adaptive optical receiver of claim 13 further comprising at least one optical attenuator coupled to at least one of the constructive and the destructive optical outputs of the delay interferometer, the at least one optical attenuator attenuating at least one of constructive and destructive optical signals in order to provide different signal contributions.

20. The adaptive optical receiver of claim 13 further comprising at least one optical amplifier coupled to at least one of the constructive and the destructive optical outputs of the delay interferometer, the at least one optical amplifier attenuating at least one of constructive and destructive optical signals in order to provide different signal contributions.

21. The adaptive optical receiver of claim 13 further comprising at least one electrical attenuator coupled to at least one of the first and second photodiodes, the at least one electrical attenuator attenuating at least one of the first and second electrical detection signal in order to provide different signal contributions.

22. The adaptive optical receiver of claim 13 further comprising at least one electrical amplifier coupled to at least one of the first and second photodiodes, the at least one electrical amplifier amplifying at least one of the first and second electrical detection signal in order to provide different signal contributions.

23. An optical transmission system comprising:
a. a transmitter that generates a phase modulated optical signal at an output, the transmitter having a transmitter bandwidth;
b. an optical transmission line that is coupled to the output of the transmitter, the optical transmission line having a transmission line bandwidth;
c. a demodulator comprising a delay interferometer having an optical input that is coupled to an optical output of the optical transmission line, the delay interferometer having a free spectral range and generating a constructive and a destructive optical signal at a respective one of a constructive and a destructive output; and d. a receiver having a constructive signal input and a destructive signal input that is optically coupled to a respective one of the constructive and the destructive output of the delay interferometer, the receiver comprising a differential detector that detects the constructive and destructive optical signals and generates an electrical reception signal, the receiver comprising a receiver bandwidth, wherein the free spectral range of the delay interferometer is configured to be larger than a symbol rate of the phase modulated optical signal by an amount that is proportional to at least one of the transmitter bandwidth, the transmission line bandwidth, and the receiver bandwidth and wherein a FWHM bandwidth of an intensity transfer function as seen from the output of the transmitter to the optical input of the demodulator is less than twice the symbol rate.

24. The optical transmission system of claim 23 wherein the intensity transfer function transfers less than 95% of a signal spectrum of the transmitted phase modulated optical signal.

25. The optical transmission system of claim 23 wherein the amount that the free spectral range of the delay interferometer is larger than a symbol rate is chosen to improve at least one of an optical signal-to-noise ratio of the constructive and destructive optical signals, a receiver sensitivity and a bit error rate of the electrical reception signal.

26. The optical transmission system of claim 23 wherein the amount that the free spectral range of the delay interferometer is larger than a symbol rate is variable in response to changes in at least one of the transmitter bandwidth, the transmission line bandwidth, and the receiver bandwidth.

27. A method for receiving an optical signal, the method comprising:

a. receiving a phase modulated optical signal from a transmission system;

b. demodulating the phase modulated optical signal with a delay interferometer that generates a constructive optical signal and a destructive optical signal, the delay interferometer configured to have a delay that is less than one symbol slot and that is selected according to a bandwidth of the transmission system, wherein a FWHM bandwidth of an intensity transfer function as seen from the output of a transmitter in the transmission system to an optical input of a demodulator that receives the phase modulated optical signal from the transmission system is less than twice the symbol rate and wherein an improvement in a performance characteristic of the optical receiver is achieved relative to the performance characteristic for a delay of one symbol slot; and c. generating an electrical reception signal responsive to a differential detection of the constructive and destructive optical signals.

28. The method of claim 1 wherein the phase modulated optical signal comprises at least one of a RZ-type and a NRZ-type modulation signal.

29. The method of claim 1 wherein the phase modulated optical signal comprising at least one of a DXPSK modulated signal, where X=2, 4, 8, 16 . . . .

* * * * *